United States Patent
Matsutani

(10) Patent No.: US 10,003,717 B2
(45) Date of Patent: Jun. 19, 2018

(54) DOCUMENT PROCESSING DEVICE AND COMMUNICATION CONTROL METHOD CONSIDERING OPERATION INFORMATION

(71) Applicant: Konica Minolta, Inc., Chiyoda-ku, Tokyo (JP)

(72) Inventor: Noritsugu Matsutani, Musashino (JP)

(73) Assignee: KONICA MINOLTA, INC., Chiyoda-ku, Tokyo (JP)

( * ) Notice: Subject to any disclaimer, the term of this patent is extended or adjusted under 35 U.S.C. 154(b) by 3 days.

(21) Appl. No.: 15/252,344

(22) Filed: Aug. 31, 2016

(65) Prior Publication Data
US 2017/0070641 A1 Mar. 9, 2017

(30) Foreign Application Priority Data
Sep. 3, 2015 (JP) .................. 2015-173482

(51) Int. Cl.
*H04N 1/32* (2006.01)
*H04N 1/00* (2006.01)
(Continued)

(52) U.S. Cl.
CPC ......... *H04N 1/32683* (2013.01); *G06F 3/014* (2013.01); *G06F 3/0488* (2013.01); *H04N 1/00127* (2013.01); *H04N 1/00411* (2013.01); *G05B 2219/36418* (2013.01); *G06F 3/04883* (2013.01); *G06F 2203/04101* (2013.01); (Continued)

(58) Field of Classification Search
None
See application file for complete search history.

(56) References Cited

U.S. PATENT DOCUMENTS 9,875,433 B2 * 1/2018 Yamada ............... G06K 15/007
2006/0268336 A1 * 11/2006 Sakaniwa ............ H04L 1/0045
358/1.15

(Continued)

FOREIGN PATENT DOCUMENTS

| JP | 2004-247875 A | 9/2004 |
| JP | 2005-135316 A | 5/2005 |
| JP | 2010-148029 A | 7/2010 |

*Primary Examiner* — Miya J Williams
(74) *Attorney, Agent, or Firm* — Buchanan Ingersoll & Rooney PC

(57) ABSTRACT

A document processing device including a touchscreen type operation panel and configured to be capable of communicating with a terminal device, a position of the terminal device being likely to move in accordance with operation by a user includes: a communication unit configured to transmit and receive a radio wave to and from the terminal device to perform communication; a communication intensity detection unit configured to detect communication intensity of the terminal device received at the communication unit; an operation information detection unit configured to detect operation information of input operation when the input operation for the operation panel is performed; and a data transfer amount control unit configured to control a data transfer amount in the communication between the terminal device and the communication unit based on the communication intensity detected by the communication intensity detection unit and the operation information detected by the operation information detection unit.

20 Claims, 20 Drawing Sheets

(51) Int. Cl.
*G06F 3/0488* (2013.01)
*G06F 3/01* (2006.01)
*G06K 9/00* (2006.01)

(52) U.S. Cl.
CPC ..... *G06K 9/00335* (2013.01); *G06K 9/00355* (2013.01); *G06K 9/00389* (2013.01); *H04N 1/00381* (2013.01); *H04N 2201/0055* (2013.01); *H04N 2201/0094* (2013.01)

(56) References Cited

U.S. PATENT DOCUMENTS

| | | | | |
|---|---|---|---|---|
| 2007/0179752 | A1* | 8/2007 | Tonouchi | G06F 21/606 702/188 |
| 2008/0291283 | A1* | 11/2008 | Achiwa | H04N 1/00204 348/207.2 |
| 2009/0316206 | A1* | 12/2009 | Anezaki | H04N 1/32619 358/1.15 |
| 2010/0020355 | A1* | 1/2010 | Imai | G06F 21/35 358/1.15 |
| 2011/0026068 | A1* | 2/2011 | Yoshida | H04N 1/00347 358/1.14 |
| 2013/0100497 | A1* | 4/2013 | Amiya | G06F 3/1454 358/1.15 |
| 2014/0176991 | A1* | 6/2014 | Yun | G06F 3/1438 358/1.15 |
| 2015/0149957 | A1* | 5/2015 | Enomoto | G06F 3/038 715/784 |
| 2015/0277818 | A1* | 10/2015 | Nishii | H04N 1/00307 358/1.15 |
| 2016/0182755 | A1* | 6/2016 | Saito | H04N 1/00896 358/1.14 |
| 2016/0352939 | A1* | 12/2016 | Saito | H04N 1/00493 |
| 2016/0360049 | A1* | 12/2016 | Funakawa | H04N 1/00307 |
| 2017/0187891 | A1* | 6/2017 | Ruffing | H04N 1/00103 |

* cited by examiner

DOCUMENT PROCESSING DEVICE AND COMMUNICATION CONTROL METHOD CONSIDERING OPERATION INFORMATION

The entire disclosure of Japanese Patent Application No. 2015-173482 filed on Sep. 3, 2015 including description, claims, drawings, and abstract are incorporated herein by reference in its entirety.

BACKGROUND OF THE INVENTION

Field of the Invention

The present invention relates to a document processing device and a communication control method therefor. Specifically, the document processing device includes a touchscreen type operation panel and is configured to be capable of communicating with a terminal device, e.g., a ring-shaped wearable terminal. A position of the terminal device is likely to move in accordance with operation by a user for the operation panel.

Description of the Related Art

Conventionally, a document processing device such as a copy machine and a multi-functional peripheral (MFP) is used in an office or the like for processing document data (image data) that are input from a personal computer or the like or read and input by a scanner.

Such a document processing device typically includes a touchscreen type operation panel. A user operates an operation key or the like displayed on a screen of the operation panel using various gestures, whereby operation of the document processing device can be controlled.

Examples of a technique for transferring data that need to be processed to a processing device include techniques described in JP 2005-135316 A, JP 2004-247875 A, and JP 2010-148029 A.

Specifically, JP 2005-135316 A discloses that an image file photographed and obtained by a digital camera is transferred to a personal computer by e-mail. In this technique, the number of files attached to the e-mail is changed in accordance with communication intensity.

JP 2004-247875 A discloses that when video data are packetized and transferred in digital video signal wireless transmission, an unsuccessfully transmitted packet is accumulated, and an output code amount is reduced when the accumulated packet exceeds a reference value.

JP 2010-148029 A discloses that when a state of data transfer from a transmission terminal is bad, data are received from a nearby supporting terminal in which data that are the same as the data transmitted by the transmission terminal are stored.

In recent years, wearable terminals that can be worn and carried by users have been provided to the market. There are various types of wearable terminals such as, for example, a ring-shaped wearable terminal, a bracelet-shaped wearable terminal, or an eyeglasses-shaped wearable terminal. Since the wearable terminal is a kind of computer, the wearable terminal can store various data and transfer the data to other devices as necessary.

One possible way to utilize this feature of the wearable terminal is to cause the wearable terminal to store document data, transfer the document data to a document processing device by means of a radio wave, and print the document data. In this case, in order to prevent unnecessary communication, a communication range between the wearable terminal and the document processing device needs to be narrowed. However, since a position of the wearable terminal is likely to move in accordance with operation by a user for an operation panel, communication might be interrupted by a movement of the user's hand during the operation. When the communication is interrupted, the data transfer needs to be performed all over again from the beginning, resulting in a reduction in working efficiency.

In a case where the number of attached files is changed in accordance with communication intensity in the same way as JP 2005-135316 A described above, even if the wearable terminal is located at a position where the communication intensity is large at a certain moment, a possibility of interruption of the communication might become large when the wearable device is moved to another position by a movement of the user and the communication intensity rapidly becomes small.

In a case where an output code amount is reduced when an accumulated packet exceeds a reference value in the same way as JP 2004-247875 A, it takes time to accumulate the packet to a certain level or more, during which unsuccessful transmission continues to occur and a lot of time and packets are wasted.

If data are received from a supporting terminal in the same way as JP 2010-148029 A, the supporting terminal needs to be prepared, which requires a significant cost.

SUMMARY OF THE INVENTION

The present invention has been made in view of the above problems, and an object thereof is to make a possibility of interruption of communication as small as possible and improve working efficiency in a document processing device including a touchscreen type operation panel and configured to be capable of communicating with a terminal device, a position of which is likely to move in accordance with operation by a user for the operation panel.

To achieve the abovementioned object, according to an aspect, a document processing device including a touchscreen type operation panel and configured to be capable of communicating with a terminal device, a position of the terminal device being likely to move in accordance with operation by a user for the operation panel, reflecting one aspect of the present invention comprises: a communication unit configured to transmit and receive a radio wave to and from the terminal device to perform communication; a communication intensity detection unit configured to detect communication intensity of the terminal device received at the communication unit; an operation information detection unit configured to detect operation information indicating a detail of input operation when the input operation for the operation panel is performed; and a data transfer amount control unit configured to control a data transfer amount in the communication between the terminal device and the communication unit based on the communication intensity detected by the communication intensity detection unit and the operation information detected by the operation information detection unit.

The data transfer amount control unit preferably controls the data transfer amount in accordance with a kind of gesture operation indicated by the operation information.

For example, when the kind of the gesture operation indicated by the operation information is tap operation, swipe operation, drag operation, or flick operation, the data transfer amount is preferably reduced, and when the kind of the gesture operation indicated by the operation information is hold operation or pinch operation, the data transfer amount is preferably increased.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

Figure 1:
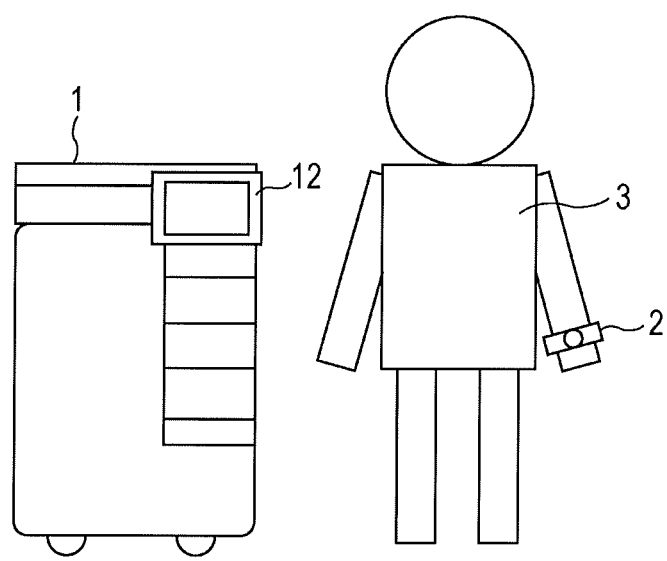
FIG. 1 is a diagram illustrating an example of a document processing device according to an embodiment of the present invention and a terminal device worn by a user.

FIG. 1 is a diagram illustrating an example of a document processing device 1 according to an embodiment of the present invention and a terminal device 2 worn by a user 3.

The document processing device 1 is an MFP that integrates functions of a copy machine, a printer, a facsimile machine, and a scanner or the like. The document processing device 1 can execute various processes related to documents (including images) such as printing, transmission to external devices, saving (storage), and digitization (scanning).

The document processing device 1 includes a touchscreen type operation panel 12 and is configured to be capable of wirelessly communicating with the terminal device 2 by means of a radio wave. A position of the terminal device 2 is likely to move in accordance with operation by the user 3 for the operation panel 12. As the terminal device 2, various portable information devices such as a wearable computer, a smartphone, and a personal digital assistant (PDA) can be used. The terminal device 2 is worn on a body of the user such as a hand and a finger, held by a hand of the user, or kept in clothes. When the user operates the operation panel 12, therefore, the terminal device 2 is likely to move along with the motion of the operation. The user sometimes places the terminal device 2 that has been carried by the user in the vicinity of the operation panel 12. In this case as well, the terminal device 2 is likely to move along with the motion of the operation of the user. The terminal device 2 illustrated in FIG. 1 is a bracelet-shaped wearable computer. However, the terminal device 2 is not limited to the bracelet-shaped wearable computer, and may be various other wearable terminals such as, for example, a ring-shaped wearable terminal which will be described later, a glove-shaped wearable terminal, and a wearable terminal sewn on clothes or the like.

Not only the single user 3 but also other users are assumed to have the terminal devices 2. In this case, among the plurality of terminal devices 2, a target of communication is the terminal device 2 held by the user 3 located at a position where the user 3 can operate the operation panel 12 near the document processing device 1. The communication is executed when conditions which will be described later are satisfied.

The document processing device 1 performs convenient functions by utilizing the terminal device 2. For example, in a document data automatic transfer function, the user 3 causes the terminal device 2 to store document data in advance, whereby the document data are automatically transferred from the terminal device 2 to the document processing device 1, and the document processing device 1 can print or save the document data. In an automatic login function, the user 3 does not need to perform any particular operation for logging in to the document processing device 1, and authentication data required for login are automatically transmitted from the terminal device 2 to the document processing device 1, whereby login can be automatically performed.

In the case of the document data automatic transfer function, the document data are automatically transferred while the user 3 performs operation to designate print conditions such as a paper size, the number of print copies, and a print color. Therefore, printing is executed quickly as compared with a case where the transfer is performed after the user 3 finishes designating the print conditions and gives an instruction to start printing, whereby the user 3 can obtain the printed sheet quickly. In other words, working efficiency for the user 3 is improved.

In the case of the automatic login function, the terminal device 2 automatically transfers the authentication data to the document processing device 1 while the user 3 performs operation to designate a process (job) to be executed by the document processing device 1, whereby time required for authentication is shortened. Therefore, working efficiency for the user 3 is improved as compared with a case where the user designates a job after the user inputs the authentication data and waits for completion of the authentication.

When data are transferred between the document processing device 1 and the terminal device 2 as described above, it is effective to limit a communication range (communication zone) to the vicinity of the document processing device 1 in order to prevent leakage of information to the outside and wrong connection to a device other than the terminal device 2. The communication range is a distance range (spatial range) in which communication for transferring document data, i.e., data to be processed in a job, is performed. The communication range is also a distance range in which communication for transferring authentication data for login to the document processing device 1 from the terminal device 2 to the document processing device 1 is performed. To sum up, the communication range is a distance range in which document data and authentication data are permitted to be transferred under certain conditions. Document data and authentication data may be transferred from the terminal device 2 to the document processing device 1, and vice versa.

Hereinafter, communication for transferring document data or authentication data for login is also referred to as "document data communication". The document data communication is performed while connection (communication) between the document processing device 1 and the terminal device 2 is established.

Figure 2A:
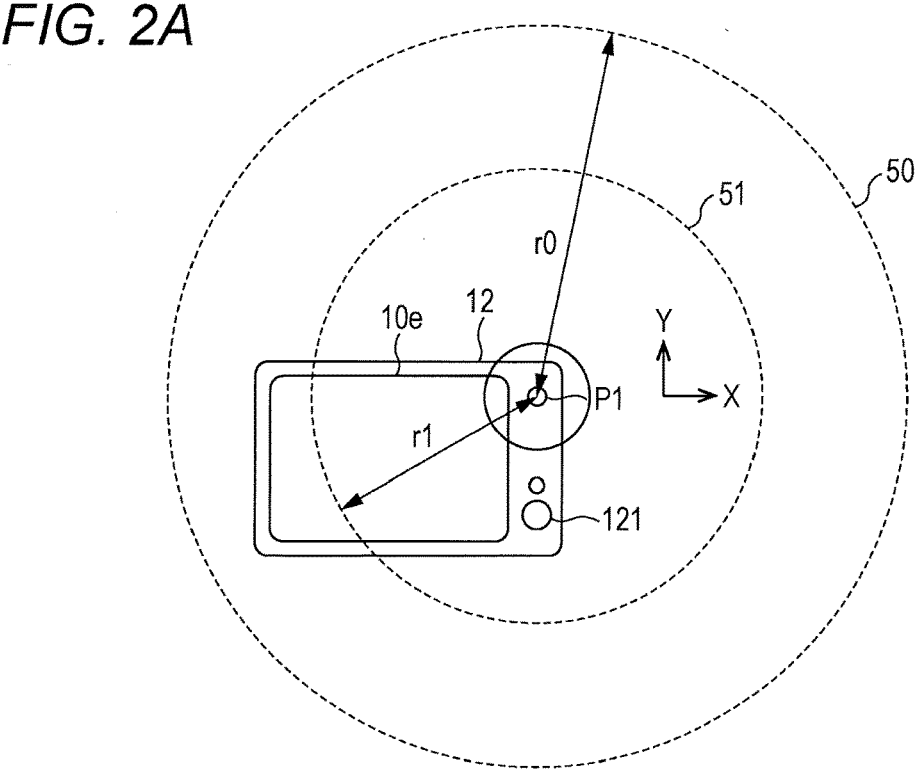
FIGS. 2A and 2B are diagrams illustrating an example of an operation panel of the document processing device and an example of a communication range.
Figure 2B:
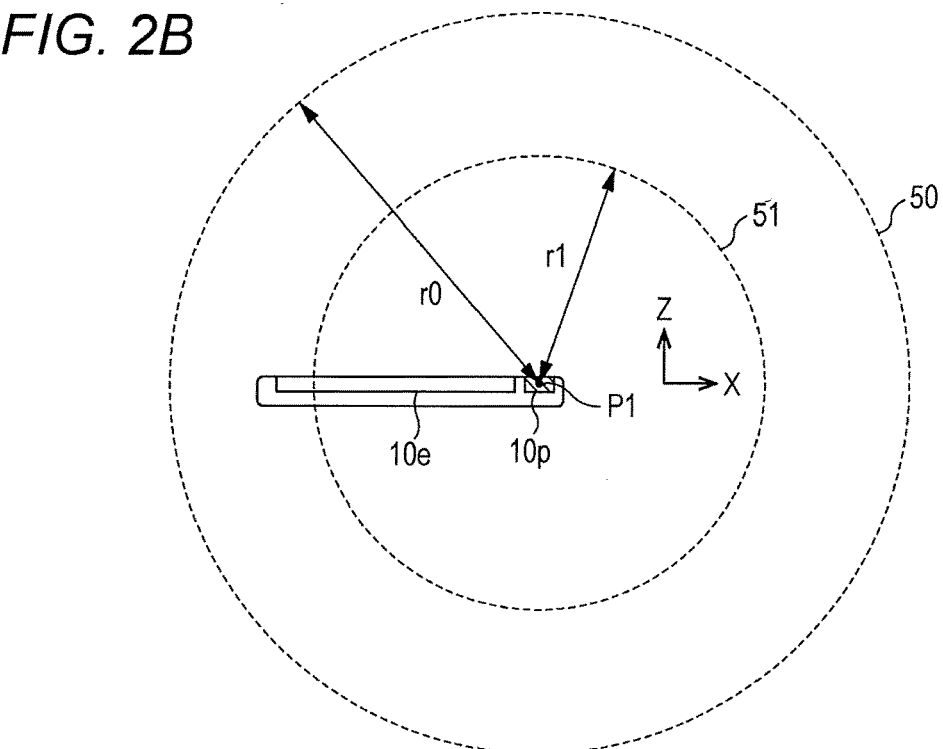

In FIGS. 2A and 2B, examples of communication ranges 50, 51 in which wireless communication between the document processing device 1 and the terminal device 2 is performed are illustrated. FIG. 2A is a diagram illustrating the communication ranges 50, 51 on an XY plane parallel to an upper face of the operation panel 12. FIG. 2B is a diagram illustrating the communication ranges 50, 51 on an XZ plane parallel to a cross section in a thickness direction of the operation panel 12.

In the document processing device 1, each of the communication ranges 50, 51 is substantially equal in all directions as long as an antenna has no directivity and there is no obstacle. Therefore, each of the communication ranges 50, 51 is formed in a spherical shape having a radius r0, r1 around a communication base point P1 at a right corner of the operation panel 12. The communication base point P1 is a position of an antenna of a wireless communication unit 10p arranged inside the operation panel 12, or a position near the position of the antenna.

The communication range 50 is set as a temporary communication range. More specifically, a three-dimensional space having a distance from the communication base point P1 smaller than a predetermined value (radius r0) is temporarily set as the communication range 50. The radius r0, for example, is set to about 20 to 100 cm. When the terminal device 2 enters the communication range 50, it is highly likely that this terminal device 2 is held by a user who is about to operate the operation panel 12. Therefore, the document processing device 1 temporarily selects this terminal device 2 as a communication partner.

In the communication range 50, the document processing device 1 may monitor transition of, for example, radio wave intensity of the terminal device 2 and a state of the operation panel 12 without establishing the connection to the terminal device 2. In the communication range 50, the document processing device 1 may establish the connection to the terminal device 2, and monitor whether the conditions for executing the document data communication are satisfied while the connection is established.

On the other hand, the communication range 51 is set as a definitive communication range. The communication range 51 is narrower than the communication range 50. The radius r1 of the communication range 51, for example, is set to 10 cm. When the terminal device 2 enters the communication range 51, it is very highly likely that this terminal device 2 is held by a user that operates the operation panel 12. Therefore, the document processing device 1 definitively selects this terminal device 2 as a communication partner.

In the communication range 51, the document processing device 1 may establish the connection to the terminal device 2 and execute the document data communication. In a case where the connection to the terminal device 2 has already been established, the document data communication may be executed when the terminal device 2 enters the communication range 51.

After the connection to the terminal device 2 is established and the necessary document data communication is completed, the document processing device 1 only needs to release the connection (disconnect the communication) when the document processing device 1 is put in a predetermined state, i.e., for example, when a distance to the terminal device 2 becomes larger than a predetermined distance. In this case, stability of the document data communication is preferably considered.

Figure 3:
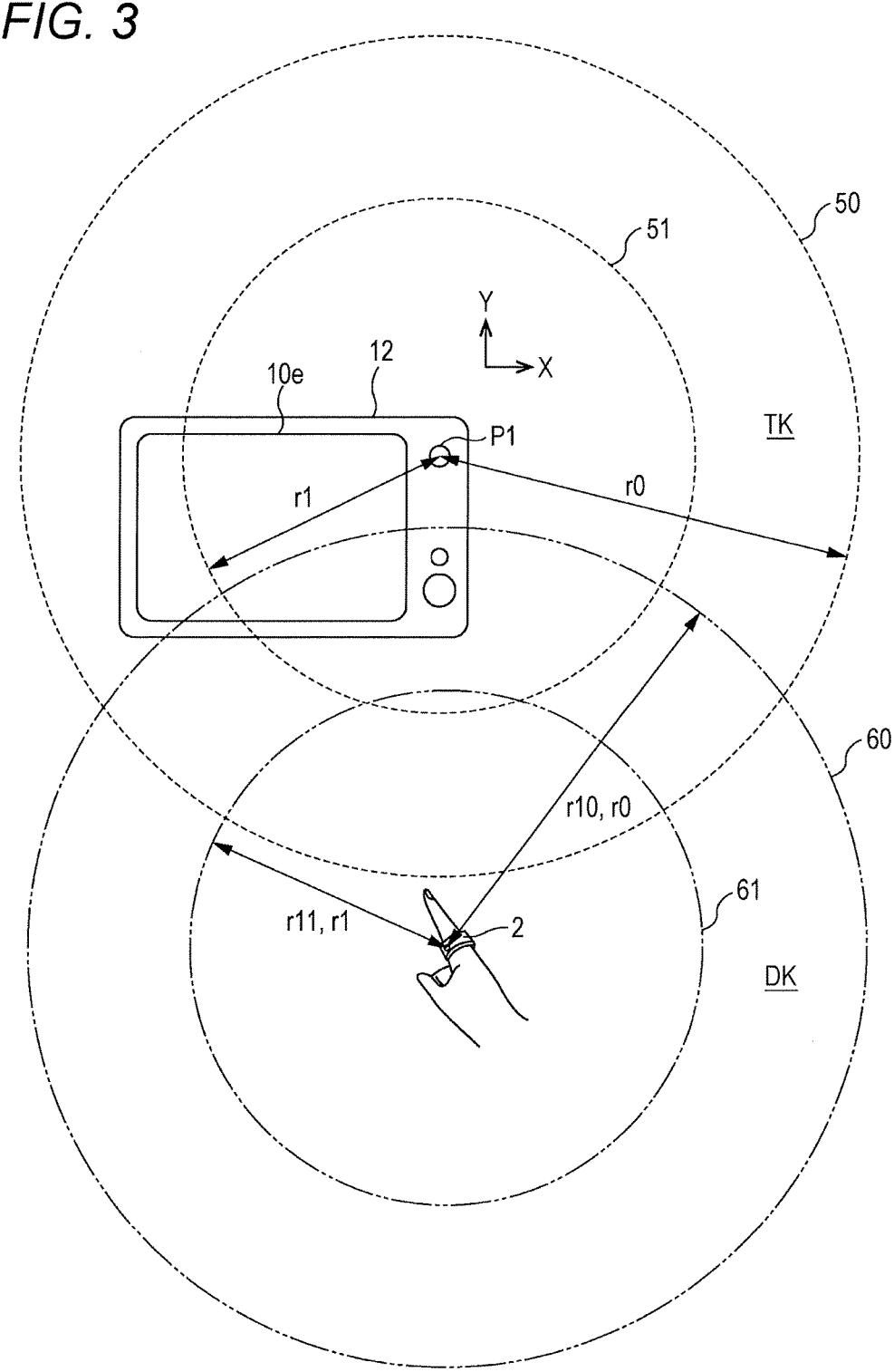
FIG. 3 is a diagram illustrating a relation between the communication range and communication intensity.

FIG. 3 is a diagram illustrating a relation between the communication ranges 50, 51 and communication intensity TK.

In FIG. 3, an exemplary contour line related to radio wave intensity DK emitted from the terminal device 2 is illustrated. The radio wave intensity DK is substantially equal in all directions as long as an antenna of the terminal device 2 has no directivity and there is no obstacle. Therefore, the radio wave intensity DK is formed in a spherical shape having a radius r10, r11 around the terminal device 2. More specifically, the larger a distance from the terminal device 2 becomes, the smaller the radio wave intensity DK becomes.

Among concentric circles around the terminal device 2, a circle having the radius r10 is represented as a temporary intensity circle 60. The temporary intensity circle 60 is a circle corresponding to the temporary communication range 50. In the present embodiment, r10 is equal to r0.

When the terminal device 2 located far from the operation panel 12 approaches the operation panel 12, therefore, just as the communication base point P1 enters the temporary intensity circle 60, the terminal device 2 enters the temporary communication range 50 of the document processing device 1. At this time, it can be said that the radio wave intensity DK of the terminal device 2 at the communication base point P1 has reached a threshold value th0 at which the document data communication can be permitted.

Therefore, the radio wave intensity DK at a position apart from the terminal device 2 by the radius r10 is set as the threshold value th0 of the communication intensity TK of the document processing device 1, whereby the temporary communication range 50 is set. Consequently, the document processing device 1 recognizes that the terminal device 2 has entered the temporary communication range 50 when the radio wave intensity DK exceeds the threshold value th0. The radio wave intensity DK is thus an example of the communication intensity TK.

A circle having the radius r11 around the terminal device 2 is represented as a definite intensity circle 61. The definite intensity circle 61 is a circle corresponding to the definitive communication range 51. In the present embodiment, r11 is equal to r1.

When the terminal device 2 further approaches the operation panel 12, therefore, just as the communication base point P1 enters the definite intensity circle 61, the terminal device 2 enters the definitive communication range 51 of the document processing device 1. At this time, it can be said that the radio wave intensity DK of the terminal device 2 at the communication base point P1 has reached a threshold value th1 for forcibly executing the document data communication.

Therefore, the radio wave intensity DK at a position apart from the terminal device 2 by the radius r11 is set as the threshold value th1 of the communication intensity TK of the document processing device 1, whereby the definitive communication range 51 is set. Consequently, the document processing device 1 recognizes that the terminal device 2 has entered the definitive communication range 51 when the radio wave intensity DK exceeds the threshold value th1.

Since the threshold values th0, th1 of the communication intensity TK or the radio wave intensity DK respectively correspond to threshold values Lth0, Lth1 of a distance L between the communication base point P1 and the terminal device 2, the threshold values Lth0, Lth1 of the distance L may be set in place of the threshold values th0, th1. In this sense, it can be said that the threshold values th0, th1 are equivalent to the threshold values Lth0, Lth1 of the distance.

These threshold values th0, th1, Lth0, Lth1 can be determined on the basis of data obtained by an experiment, a simulation or the like. In this case, since the threshold values are changed in accordance with output power of the terminal device 2 and efficiency of the antenna or the like, values corresponding to output power and a model or the like of the terminal device 2 may be stored in the document processing device 1 as a table indicating the threshold values th0, th1, Lth0, Lth1.

Figure 4A:
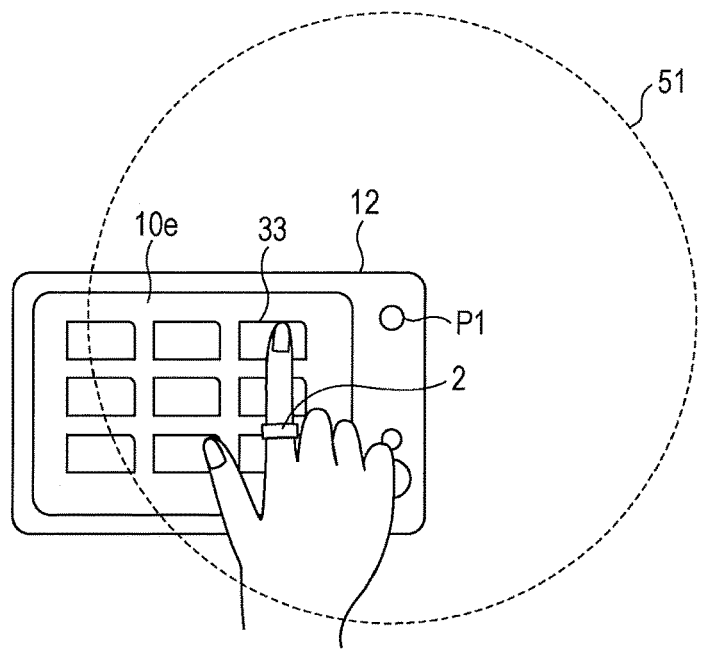
FIGS. 4A and 4B are diagrams illustrating an exemplary positional relation between the communication range and the terminal device.
Figure 4B:
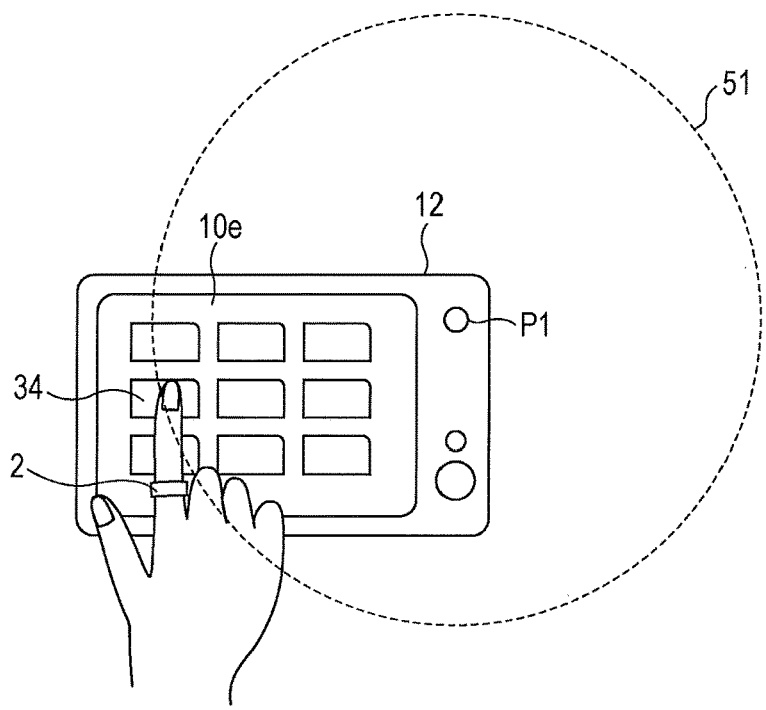

In FIGS. 4A and 4B, an exemplary positional relation between the communication range 51 and the terminal device 2 is illustrated.

In the document processing device 1 according to the present embodiment, the communication range 51 is set to such a range as to not include the entire operation panel 12. Therefore, such a case might occur that the terminal device 2 is not included in the communication range 51 even though the user 3 operates the operation panel 12.

In FIG. 4A, the user 3 operates a single operation key 33 on the operation panel 12 with a hand equipped with the ring-shaped terminal device 2. The operation key 33 is arranged in the vicinity of the communication base point P1. In this case, the terminal device 2 is included in the communication range 51.

On the other hand, in FIG. 4B, the user 3 operates a single operation key 34 that is far from the communication base point P1 as compared with the operation key 33. In this case, the terminal device 2 is not included in the communication range 51.

An amount of time required for completion of the document data communication depends on an amount of data to be transferred. When the amount of data is large, the amount of time required is sometimes a few seconds or more. During the document data communication, therefore, the position of the terminal device 2 is likely to move in accordance with the operation by the user 3.

If the terminal device 2 moves from the inside to the outside of the communication range 51 during the execution of the document data communication, the document data communication might be interrupted. If the document data communication is interrupted, the document data communication needs to be performed all over again from the beginning. Therefore, completion of the communication is delayed by an amount of time spent on the communication before the interruption. If the interruption occurs many times and each time the document data communication is performed all over again, completion of the communication is further delayed. In order to improve working efficiency for the user 3, therefore, it is preferable that the document data communication is finished in the minimum time without being interrupted.

In this regard, the document processing device 1 is equipped with a communication control function that controls a data transfer amount in the communication between the terminal device 2 and the document processing device 1 based on detected communication intensity and operation information in order to make a possibility of interruption of the communication as small as possible.

Next, a configuration and operation related to the communication control function will be described in sequence.

Figure 5:
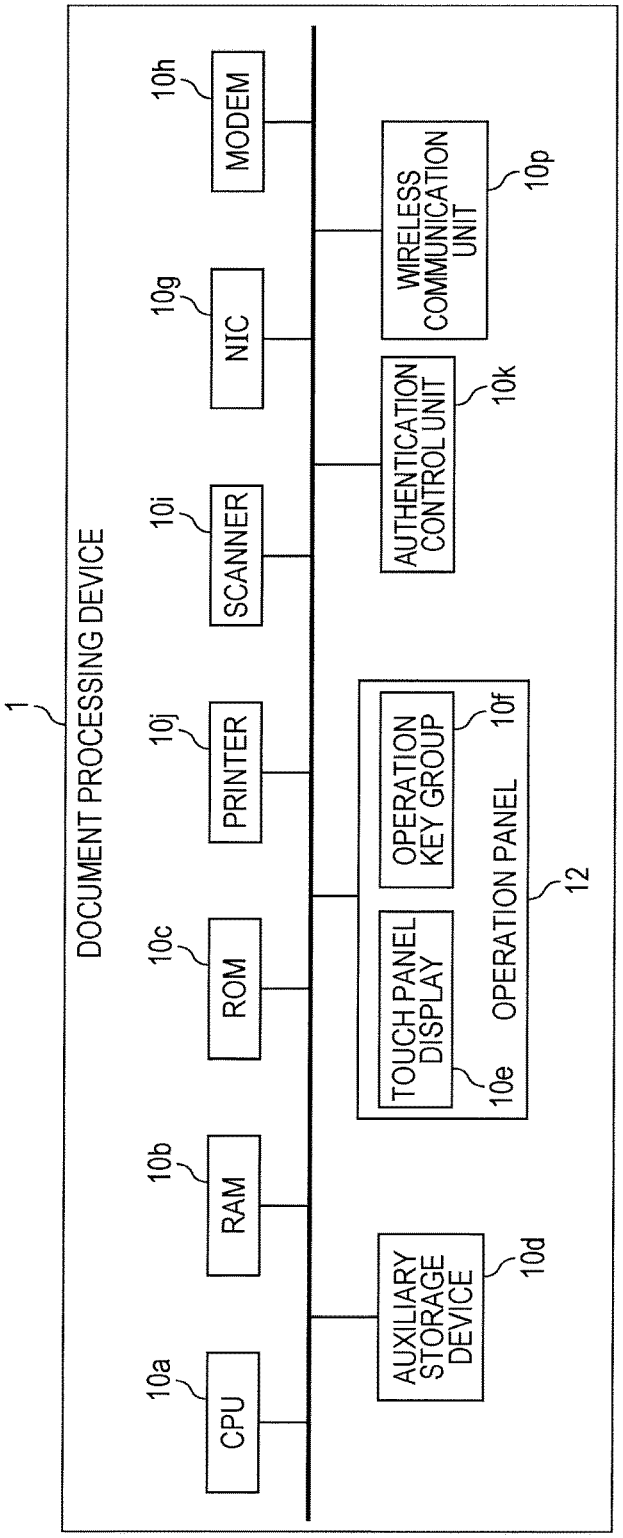
FIG. 5 is a diagram illustrating an exemplary hardware configuration of the document processing device.

In FIG. 5, an exemplary hardware configuration of the document processing device 1 is illustrated.

The document processing device 1 includes, for example, a central processing unit (CPU) 10a, a random access memory (RAM) 10b, a read only memory (ROM) 10c, an auxiliary storage device 10d, a touch panel display 10e, an operation key group 10f, a network interface card (NIC) 10g, a modem 10h, a scanner 10i, a printer 10j, an authentication control unit 10k, and the wireless communication unit 10p.

The touch panel display 10e and the operation key group 10f are included in the operation panel 12. The touch panel display 10e displays, for example, a screen indicating a message to the user, a screen for allowing the user to input a command or information, and a screen indicating a result of a process executed by the CPU 10a. The touch panel display 10e transmits, to the CPU 10a, a signal indicating a coordinate position that has been touched. The operation key group 10f includes a start key 121 (refer to FIGS. 2A and 2B) and other hardware keys.

The NIC 10g communicates with an external device by means of a protocol such as a transmission control protocol/internet protocol (TCP/IP).

The modem 10h exchanges, with a facsimile terminal, document data in a facsimile data format by means of a protocol such as G3.

The scanner 10i reads an image drawn on a sheet (original) set on platen glass and generates document data in an image data format or the like.

The printer 10j prints the image read by the scanner 10i. The printer 10j also performs network printing. More specifically, the printer 10j prints an image on paper based on data received from a personal computer or the like by the NIC 10g or data received from the facsimile terminal by the modem 10h. The printer 10j further prints an image on paper based on document data received from the terminal device 2 by the wireless communication unit 10p.

The authentication control unit 10k performs a process for user authentication based on authentication data or the like received from the terminal device 2 by the wireless communication unit 10p. The authentication control unit 10k also authenticates a communication partner, that is, the terminal device 2, and performs a process for establishing the connection such as pairing.

The wireless communication unit 10p transmits and receives a radio wave to and from the terminal device 2 to perform communication using a position on the operation panel 12 as the communication base point P1. Only the antenna of the wireless communication unit 10p may be arranged at the communication base point P1. The wireless communication unit 10p is an example of a "communication unit" in the present invention. The wireless communication unit 10p communicates with the terminal device 2 by means of, for example, a protocol (profile) conforming to a standard of Bluetooth (registered trademark) or Bluetooth (registered trademark) low energy.

In the ROM 10c or the auxiliary storage device 10d, a program for causing the document processing device 1 to operate as a copy machine, a printer, a facsimile machine, and a scanner or the like is stored. Furthermore, a working efficiency improving program for realizing the above-mentioned functions related to the document data communication is stored.

These programs are loaded on the RAM 10b as necessary and executed by the CPU 10a. A hard disk drive, a solid state drive (SSD) or the like is used as the auxiliary storage device 10d.

Figure 6:
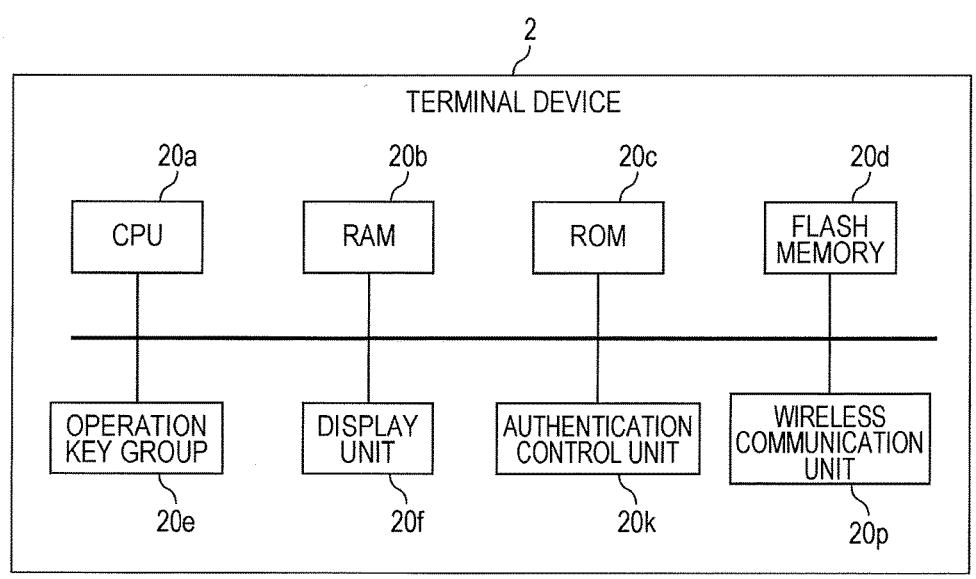
FIG. 6 is a diagram illustrating an exemplary hardware configuration of the terminal device.

In FIG. 6, an exemplary hardware configuration of the terminal device 2 is illustrated.

The terminal device 2 includes, for example, a CPU 20a, a RAM 20b, a ROM 20c, a flash memory 20d, an operation key group 20e, a display unit 20f, an authentication control unit 20k, and a wireless communication unit 20p.

The operation key group 20e includes various operation keys needed for the operation for the terminal device 2.

The display unit 20f has a display or a lamp that indicates a state of the terminal device 2. The display unit 20f may have a touch panel display that displays various screens.

The authentication control unit 20k performs a process of transmitting, to the document processing device 1, authentication data required for the user 3 to log in to the document processing device 1. The authentication data may be a user ID and a password input to the authentication control unit 20k in advance. In a case where the terminal device 2 is a wearable type, the authentication control unit 20k may detect biological information (for example, pulse wave) of the user 3 equipped with the terminal device 2, and transmit the detection data as the authentication data.

The authentication control unit 20k also authenticates a communication partner, that is, the document processing device 1, and performs a process for establishing the connection such as pairing.

The wireless communication unit 20p transmits and receives a radio wave to and from the wireless communication unit 10p of the document processing device 1 to perform communication. An antenna is included in the wireless communication unit 20p.

Figure 7:
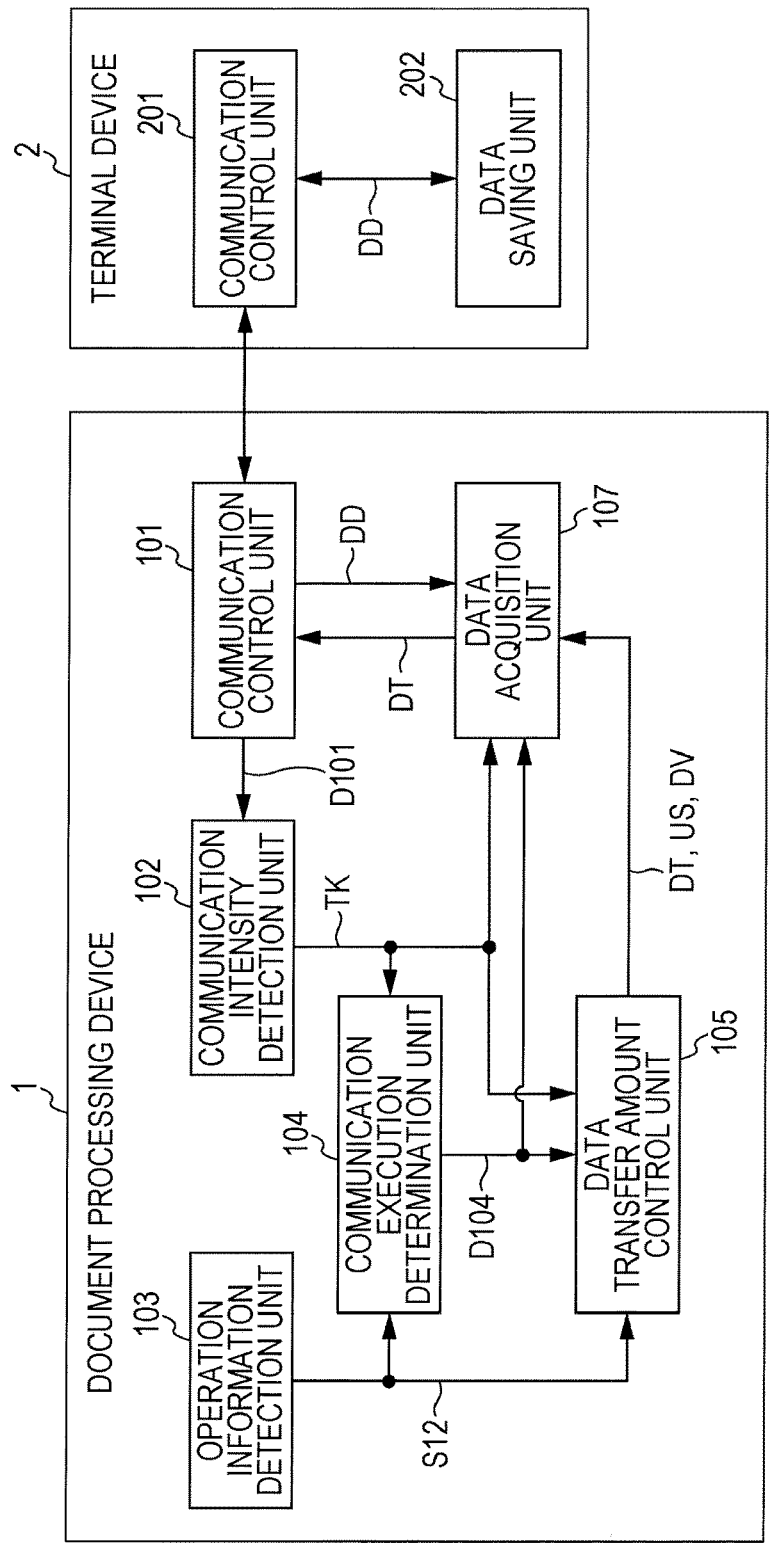
FIG. 7 is a diagram illustrating an exemplary functional configuration of the document processing device.

In FIG. 7, an exemplary functional configuration of the document processing device 1 is illustrated.

Referring to FIG. 7, the document processing device 1 is provided with, for example, a communication control unit 101, a communication intensity detection unit 102, an operation information detection unit 103, a communication execution determination unit 104, a data transfer amount control unit 105, and a data acquisition unit 107. These functions are realized by the above-mentioned hardware configuration and by the above-mentioned working efficiency improving program or the like executed by the CPU 10a.

The communication control unit 101 controls the communication with the terminal device 2 performed by the wireless communication unit 10p and performs a process required for establishing the connection. The communication control unit 101 also generates communication state data D101 indicating a state of the communication with the wireless communication unit 20p of the terminal device 2. In the communication state data D101, information indicating output power or a class that is determined in accordance with a specification of the wireless communication unit 20p of the terminal device 2 can be included together with information indicating a current reception state of a radio wave. These items of information only need to be acquired from the terminal device 2, for example, before the connection to the terminal device 2 is established or when the connection is established. Alternatively, these items of information may be acquired in such a manner that identification information (for example, MAC address) specifying the terminal device 2 is acquired when the connection is established, and a database of specifications of various devices is searched.

The communication intensity detection unit 102 detects the communication intensity TK of the terminal device 2 received at the wireless communication unit 10p based on, for example, the information indicating the reception state included in the communication state data D101.

When input operation for the operation panel 12 is performed, the operation information detection unit 103 detects operation information S12 including a coordinate position (touch coordinates) of the input operation. The input operation includes a touch and various kinds of gesture operation for the touch panel display 10e and a press on a hard operation key of the operation key group 10f. The gesture operation includes tap operation, swipe operation, drag operation, flick operation, hold operation, and pinch operation or the like.

The communication execution determination unit 104 determines whether to execute the communication (document data communication) with the terminal device 2 based on the communication intensity TK. More specifically, when the communication intensity TK exceeds a threshold value th, the communication execution determination unit 104 determines that the terminal device 2 is within the communication range and to execute the communication with the terminal device 2. At this time, for example, the threshold value th1 for the definitive communication range 51, the threshold value th0 for the temporary communication range 50, and other threshold values th can be used as the threshold value th.

As described above, since the radio wave intensity DK from the terminal device 2 depends on the output power of the terminal device 2, the threshold value th only needs to be determined in accordance with the output power of the terminal device 2 acting as a communication partner. Instead of changing the threshold value th in accordance with the output power, the threshold value th may be normalized by, for example, multiplying the radio wave intensity DK by a coefficient that depends on the output power. In this case, the radio wave intensity DK can be normalized and used as the communication intensity TK.

When the connection is established, calibration may be performed in such a manner that the user 3 causes the terminal device 2 to come into contact with a mark indicating the communication base point P1 on a face of the operation panel 12, and the document processing device 1 measures the radio wave intensity DK at that time.

As explained earlier, determining whether to execute the communication based on the communication intensity using the threshold value th is equal to determining based on the distance L between the document processing device 1 and the terminal device 2. Therefore, the communication execution determination unit 104 may be configured to determine to execute the communication with the terminal device 2 when the distance L to the terminal device 2 obtained on the basis of the communication intensity TK detected by the wireless communication unit 10p is equal to or less than a predetermined threshold value (value corresponding to a radius r of the communication range) Lth.

The communication execution determination unit 104 can also determine whether the input operation is performed based on the operation information S12, and determine to execute the communication with the terminal device 2 when the input operation is performed. In this case, it is preferable to set such a precondition that the terminal device 2 is included in a predetermined communication range, i.e., the communication intensity TK is equal to or greater than a predetermined threshold value th. In this case, for example, the temporary communication range 50 can be used as the predetermined communication range.

The data transfer amount control unit 105 and the data acquisition unit 107 or the like are notified of a result D104 of the determination by the communication execution determination unit 104.

When the communication is determined to be executed by the communication execution determination unit 104, the data acquisition unit 107 cooperates with the communication control unit 101 to transfer document data DD saved in a data saving unit 202 of the terminal device 2 from the terminal device 2 to the document processing device 1. At this time, a data transfer amount DT in the communication is controlled by the data transfer amount control unit 105 which will be described next.

The data acquisition unit 107 stores the transferred document data DD, for example, in the auxiliary storage device 10$d$. After that, when the user 3 gives an instruction to start printing, the document data DD are printed by the printer 10$j$. After the printing is completed, the document data DD that have become unnecessary are deleted.

The data transfer amount control unit 105 controls the data transfer amount DT in the communication between the terminal device 2 and the communication control unit 101 based on the communication intensity TK detected by the communication intensity detection unit 102 and the operation information S12 detected by the operation information detection unit 103. More specifically, the data transfer amount control unit 105 changes the data transfer amount DT based on the communication intensity TK and the operation information S12 so that it is possible to transfer as many data as possible at a time within such a range that the communication is expected not to be interrupted.

For example, when the communication intensity TK is greater than a threshold value th2, the data transfer amount control unit 105 increases the data transfer amount DT, and when the communication intensity TK is less than the threshold value th2, the data transfer amount control unit 105 reduces the data transfer amount DT.

The data transfer amount control unit 105 is also configured to: increase the data transfer amount DT when the operation information S12 indicates that there is operation and the communication intensity TK is greater than a threshold value th3; reduce the data transfer amount DT when the operation information S12 indicates that there is operation and the communication intensity TK is less than the threshold value th3; increase the data transfer amount DT when the operation information S12 indicates that there is no operation and the communication intensity TK is greater than the threshold value th3; and set the data transfer amount DT to 0 when the operation information S12 indicates that there is no operation and the communication intensity TK is less than the threshold value th3.

The data transfer amount control unit 105 controls the data transfer amount DT in accordance with a kind of the gesture operation indicated by the operation information S12.

For example, when the kind of the gesture operation indicated by the operation information S12 is the tap operation, the swipe operation, the drag operation, or the flick operation, the data transfer amount DT is reduced, and when the kind of the gesture operation indicated by the operation information S12 is the hold operation or the pinch operation, the data transfer amount DT is increased.

The data transfer amount control unit 105 predicts and obtains a distance from the terminal device 2 to a position where the terminal device 2 goes out of the communication range 51 based on the coordinate position and the kind of the gesture operation indicated by the operation information S12. The data transfer amount control unit 105 then controls the data transfer amount DT in accordance with the obtained distance.

In a case where the operation information detection unit 103 detects, as the operation information S12, operation accompanied by a movement in a certain direction (such as swipe and drag), the data transfer amount control unit 105 reduces the data transfer amount DT when the communication intensity TK is equal to or less than a threshold value th4, and increases the data transfer amount DT when the communication intensity TK exceeds the threshold value th4.

When a movement velocity MV of the coordinate position indicated by the operation information S12 is greater than a threshold value Mth1, the data transfer amount control unit 105 reduces the data transfer amount DT.

When a time interval JK of the input operation for the operation panel 12 is longer than a threshold value Jth1, the data transfer amount control unit 105 reduces the data transfer amount DT.

When input operation for a hierarchized operation key is performed on the operation panel 12, the data transfer amount control unit 105 increases the data transfer amount DT.

The data transfer amount control unit 105 predicts and obtains a distance from the terminal device 2 to a position where the terminal device 2 goes out of the communication range 51 based on the coordinate position and the communication intensity TK indicated by the operation information S12. The data transfer amount control unit 105 then controls the data transfer amount DT in accordance with the obtained distance.

In the case of an authentication mode, the data transfer amount control unit 105 controls the data transfer amount DT in the communication between the terminal device 2 and the communication control unit 101 in accordance with the magnitude of the communication intensity TK. The communication control unit 101 finishes the communication with the terminal device 2 after the authentication is completed.

The data transfer amount control unit 105 controls the data transfer amount DT in the communication between the terminal device 2 and the communication control unit 101 in accordance with the magnitude of the communication intensity TK. The communication control unit 101 executes the communication and receives document data when the document data are stored in the terminal device 2. The communication control unit 101 finishes the communication with the terminal device 2 after the reception of the document data is completed.

In the present embodiment, a transmission unit US of data (document data DD) transmitted from the terminal device 2 to the communication control unit 101 is used as the data transfer amount DT. In this case, the data transfer amount control unit 105 controls the transmission unit US so that the transmission unit US of data transmitted at a time is variable, i.e., increased or reduced. For example, in a case where data for one page in total are transferred, the data are divided into a plurality of blocks having the same transmission unit US or different transmission units US.

The smaller the transmission unit US is, the shorter an amount of time required for one time of transmission (transmission of a single block) is. Therefore, the interruption of the communication caused by, for example, the terminal device 2 that goes out of the communication range 51 during the communication hardly occurs. Even if the communication is interrupted just before the end of the transmission, the time spent on the transmission wasted by the interruption is shorter than the time that is spent when the transmission having a large transmission unit US is interrupted just before the end of it.

However, the smaller the transmission unit US of the block is, the larger the number of divisions of the document data DD is. Every time the block is transmitted, a transmission side needs to perform a process (preparation for transmission) of, for example, attaching a header and a footer to the block and generating a transfer bit string, and a reception side needs to perform a restoring process of, for example, extracting the block from the received transfer bit string. Therefore, the smaller the transmission unit US is, the more an amount of processes that accompanies the transfer (transmission and reception) of the document data DD increases. The total time required for transferring the entire document data DD might also become long.

In order to transfer the document data DD efficiently, therefore, it is preferable to perform control so as to increase the transmission unit US as much as possible within such a range that the communication is expected not to be interrupted.

Figure 8:
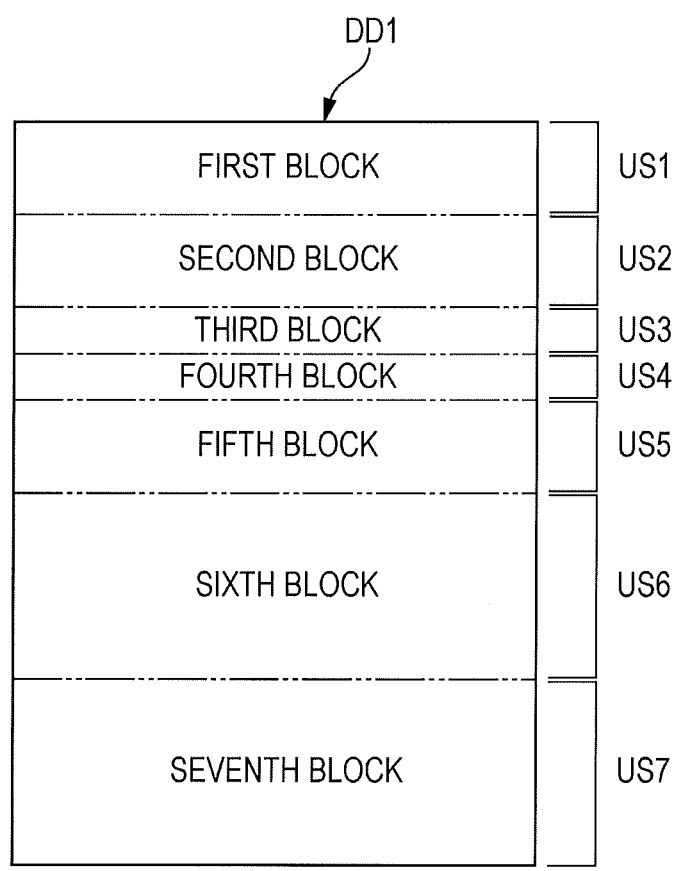
FIG. 8 is a diagram illustrating an example of division of document data.
Figure 9:
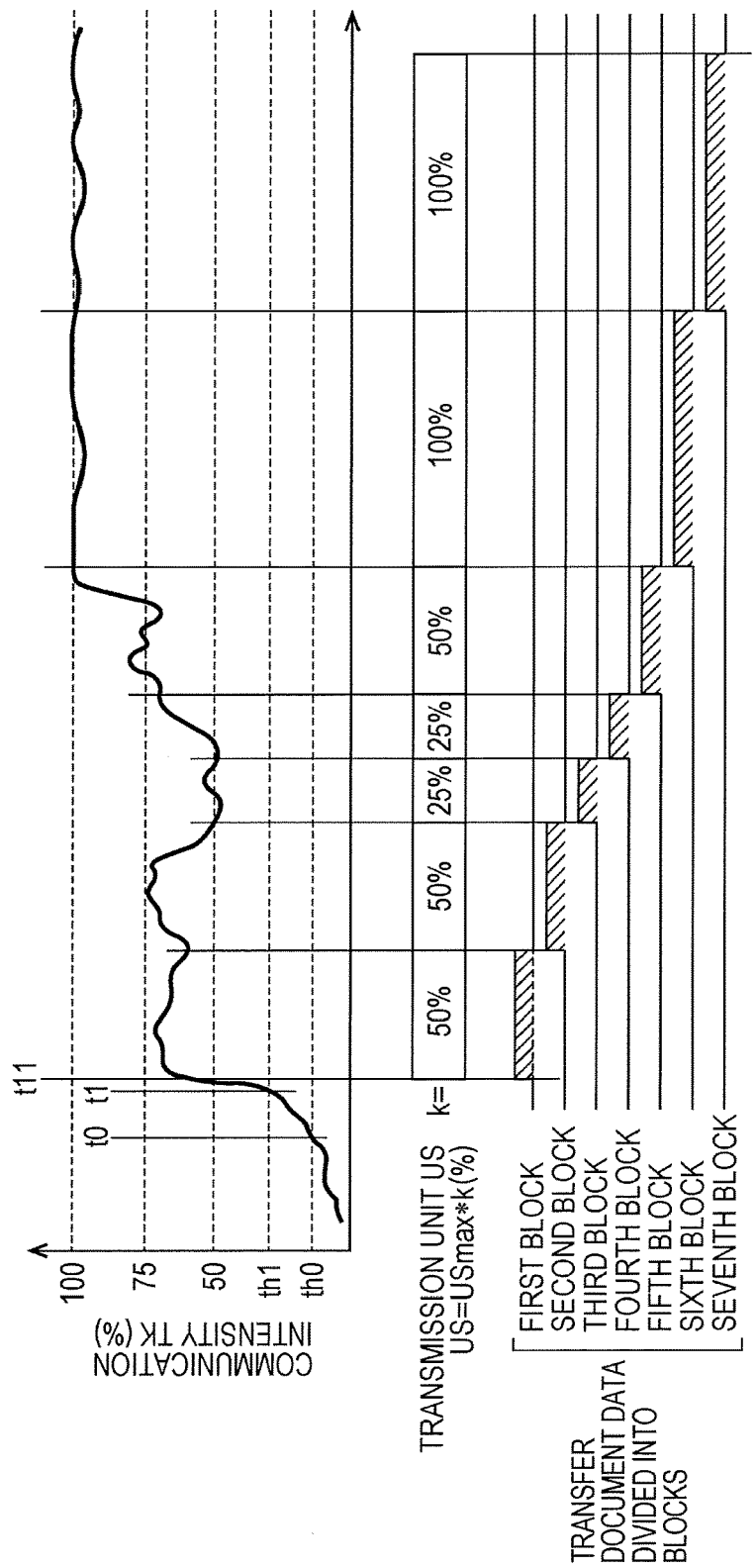
FIG. 9 is a diagram illustrating an example of a change of the communication intensity TK and control of a transmission unit that depends on the change.

An example of division of document data DD1 is illustrated in FIG. 8, and an example of a change of the communication intensity TK and control of the transmission unit US that depends on the change is illustrated in FIG. 9. FIG. 9 corresponds to the example in FIG. 8.

In the example illustrated in FIG. 8, the document data DD1 for one page are divided into blocks of transmission units US1, US2, US3, . . . US7 having various sizes. As the transmission unit US, a plurality of pieces of line data constituting the document data DD1 is assigned.

For example, assuming that the document data DD1 are data obtained in such a manner that an A4 original is scanned at 300 dpi, there are about 3500 lines in total. If 3500 lines are divided into 10 divisions, one division has 350 lines. In this regard, for example, 350 lines are assumed to be a maximum value USmax of the transmission unit US, and a value obtained by multiplying the maximum value USmax by a coefficient k equal to or less than 1 is assumed to be the transmission unit US of one time of transmission. Assuming that 0.5 seconds are required for the transmission of 350 lines, it is considered that there is a sufficient possibility that one time of transmission can be completed during this period since it is highly likely that a hand of the user is kept substantially stationary or not moved greatly for 0.5 seconds.

In this case, when the coefficient k is 1, the transmission unit US is 350 lines. When the coefficient k is 0.5, 0.25, 0.1, and 0.95, the transmission unit US is 175 lines, 88 lines, 35 lines, and 30 lines, respectively.

In FIG. 8, each of the transmission units US6, US7 of the sixth and seventh blocks is the maximum value USmax. Each of the transmission units US1, US2, US5 of the first, second, and fifth blocks is 50% of the maximum value USmax, and each of the transmission units US3, US4 of the third and fourth blocks is 25% of the maximum value USmax.

In other words, the example in FIG. 8 indicates that the document data DD1 were divided into seven blocks and sequentially transferred as follows.

Referring also to FIG. 9, at a point of time t11 to start transferring the document data DD1, the communication intensity TK was around 60% and not so strong as represented by a thick solid line in the drawing. Therefore, transmission of the first block was performed with the transmission unit US1 set to 50%. Since the communication intensity TK of the second transmission was not so strong, the transmission unit US2 was set to 50%. Since the communication intensity TK was reduced in the third transmission and the fourth transmission, the transmission units US3, US4 were set to 25%. Since the communication intensity TK of the fifth transmission became a little stronger, transmission was performed with the transmission unit US5 set to 50%. Since the communication intensity TK became much stronger and stable, the transmission units US6, US7 of the sixth transmission and the seventh transmission were set to 100%. All the document data DD1 were transferred by the first transmission to the seventh transmission.

As the document data DD, raw data obtained by scanning, photographing or the like, intermediate data subjected to a process such as compression, composite data partitioned into regions such as a photograph region, a character region, and a line drawing region, or data of each region, electronically produced data, and other data can be used.

As the data transfer amount DT, a data transfer velocity DV can also be used. In this case, the data transfer amount control unit 105 sets or changes the data transfer velocity DV to, for example, 50 kbps, 100 kbps, 0.4 Mbps, 0.7 Mbps or the like.

Hereinafter, the operation of each of the document processing device 1 and the terminal device 2 will be described with reference to an example in which the user 3 causes the document processing device 1 to print a document saved in the terminal device 2 in advance.

The user 3 equipped with the terminal device 2 operates the touch panel display 10e of the operation panel 12 and, for example, designates print conditions including the selection of a document to be printed. When the designation of the print conditions is finished, the user 3 presses the start key 121 to give an instruction to start printing.

When the user 3 operates the touch panel display 10e, the terminal device 2 enters the communication range 51, for example, as illustrated in FIG. 4A. When the terminal device 2 enters the communication range 51, the document data communication is started without waiting for the user 3 to press the start key 121, and the document data DD of the document to be printed are obtained from the terminal device 2.

Referring again to FIG. 9, as the user 3 approaches the document processing device 1, the terminal device 2 held by the user 3 approaches the communication base point P1. When the terminal device 2 approaches the communication base point P1, the communication intensity TK increases.

The communication intensity TK increases from a value less than the threshold value th0, exceeds the threshold value th0 at a point of time t0, and exceeds the threshold value th1 at a point of time t1.

At a timing when the communication intensity TK exceeds the threshold value th1, that is, at a timing when the terminal device 2 enters the communication range 51, the communication execution determination unit 104 determines to execute the document data communication with the terminal device 2. This determination causes the communication control unit 101 to establish the connection to the terminal device 2, and the data acquisition unit 107 acquires the document data DD from the terminal device 2 in the following way.

The data acquisition unit 107 requests the transfer of the document data DD and inquires of the terminal device 2 about an amount of data of the document data DD. When the amount of data of the document data DD is larger than the maximum value USmax of the transmission unit US, the document data DD are divided into a plurality of divisions and sequentially transferred.

Via the communication control unit 101, the data acquisition unit 107 notifies the terminal device 2 of the transmission unit US (data transfer amount DT) set by the data transfer amount control unit 105.

The communication control unit 201 of the terminal device 2 extracts a part of the document data DD as the first block, adds a header and a footer to the first block, and transmits the first block to the document processing device 1. In the first transmission, a part ranging from the top of the document data DD to a point where the amount of data reaches the transmission unit US is a block to be transmitted.

The data acquisition unit 107 of the document processing device 1 receives the transmitted first block. The reception of the block succeeds when the reception is not interrupted from the header to the footer.

After the reception of the first block is completed, or during the reception, the data transfer amount control unit 105 newly sets the transmission unit US based on the latest operation information S12 and the latest communication intensity TK. The data acquisition unit 107 notifies the terminal device 2 of the newly set transmission unit US.

When the communication control unit 201 of the terminal device 2 is newly notified of the transmission unit US, the communication control unit 201 extracts the second block from the document data DD and prepares to transmit the second block. The second block is a part of the document data DD continuing from the first block to a point where the amount of data reaches the transmission unit US of the new notification.

After the transmission of the first block is finished, the communication control unit 201 transmits the second block, and the data acquisition unit 107 receives the transmitted second block.

Afterward, the document processing device 1 and the terminal device 2 perform a process that is the same as that for the transmission of the second block until the transfer of the entire document data DD is completed. More specifically, after the reception of the block is completed, or during the reception, the data transfer amount control unit 105 sets the transmission unit US to be applied to the transfer of the next block. The communication control unit 201 of the terminal device 2 extracts, from the document data DD, the block of the transmission unit US in which the amount of data has been newly set, and transmits the block. The block to be extracted is an unextracted part of the document data DD continuing from the preceding block. The data acquisition unit 107 receives the transmitted block.

The data acquisition unit 107 connects the received first to last blocks, thereby restoring the document data DD.

The amount of data of each block does not necessarily need to completely coincide with the transmission unit US, and only needs to be a value close to the transmission unit US. For example, in a case where the document data DD are image data including a plurality of lines, the document data DD may be divided into blocks in units of lines. In this case, a difference between the set transmission unit US and the amount of data of the extracted block is a maximum of one line.

As described above, the document data DD are divided into a plurality of blocks and transferred, and the transmission unit US is set for each block, whereby the transfer of each block is not interrupted, and the amount of time required for the transfer of the document data DD can be made as short as possible.

Hereinafter, the operation of the document processing device 1 will be described with reference to flowcharts.

Figure 10:
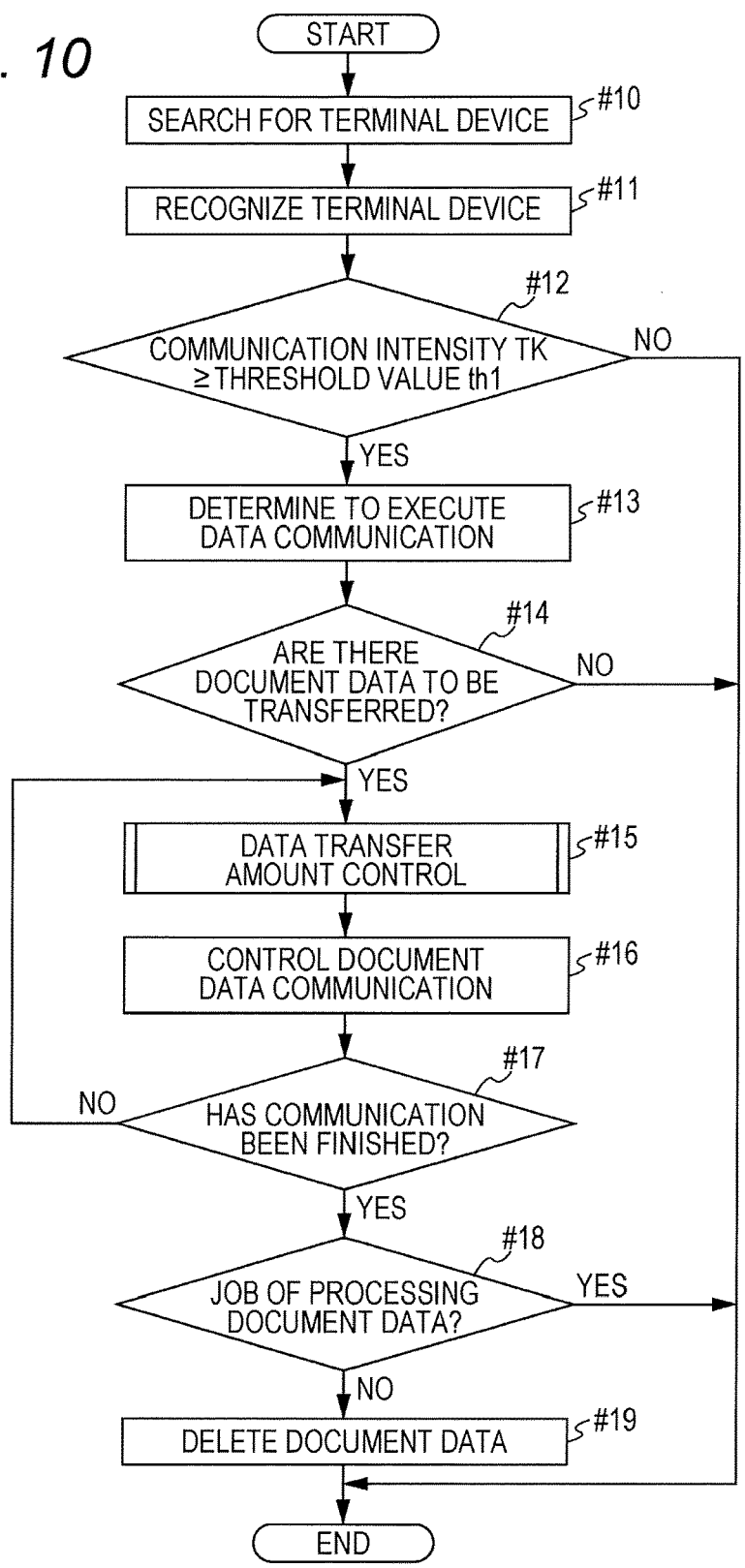
FIG. 10 is a flowchart illustrating an example of an overall process flow in the document processing device.

In FIG. 10, an example of an overall process flow in the document processing device 1 is illustrated.

The document processing device 1 searches for the terminal device 2 (#10). For example, from radio waves of one or more terminal devices 2 received by the wireless communication unit 10$p$, the communication intensity TK of them is acquired, whereby the nearest terminal device 2 is recognized. Then, the terminal device 2 that has entered the temporary communication range 51 is recognized as the terminal device 2 permitted to be a partner in the document data communication (#11).

When the communication intensity TK is equal to or greater than the threshold value th1 (YES in #12), the document processing device 1 determines that the terminal device 2 has entered the definitive communication range 51 and to execute the document data communication (#13), and checks whether there are document data DD to be transferred from the terminal device 2 (#14). When NO is selected in step #12 or step #14, the process of the flow in FIG. 10 is finished.

When there are document data DD (YES in #14), data transfer amount control is performed (#15), and the document data communication is executed based on the controlled data transfer amount DT (#16). In the data transfer amount control, as described above, for example, the transmission unit US is controlled or the data transfer velocity DV is controlled. The data transfer amount control will be described later based on flowcharts in FIGS. 11, 12, 14, and 16 to 19.

After the document data communication is finished (YES in #17), it is checked whether there is a job for processing the document data DD based on the operation information S12 (#18).

When YES is selected in step #18, the process of the flow in FIG. 10 is finished. In this case, the document processing device 1 executes the job of processing the document data DD in response to the input operation to give an instruction to start executing the job. For example, when the given job is a print job, a document corresponding to the document data DD is printed. When the given job is a facsimile transmission job, the document data DD are transmitted to a transmission destination designated by the user 3. When the given job is a saving job, the document data DD are stored in a saving destination designated by the user 3.

When NO is selected in step #18, the temporarily stored document data DD are deleted (#19). As a result, it is possible to prevent such a problem that the document data DD in the terminal device 2 are saved in the document processing device 1 even though the user 3 does not give an instruction to save the document data DD.

Hereinafter, examples of a process for the data transfer amount control in step #15 will be described.

Figure 11:
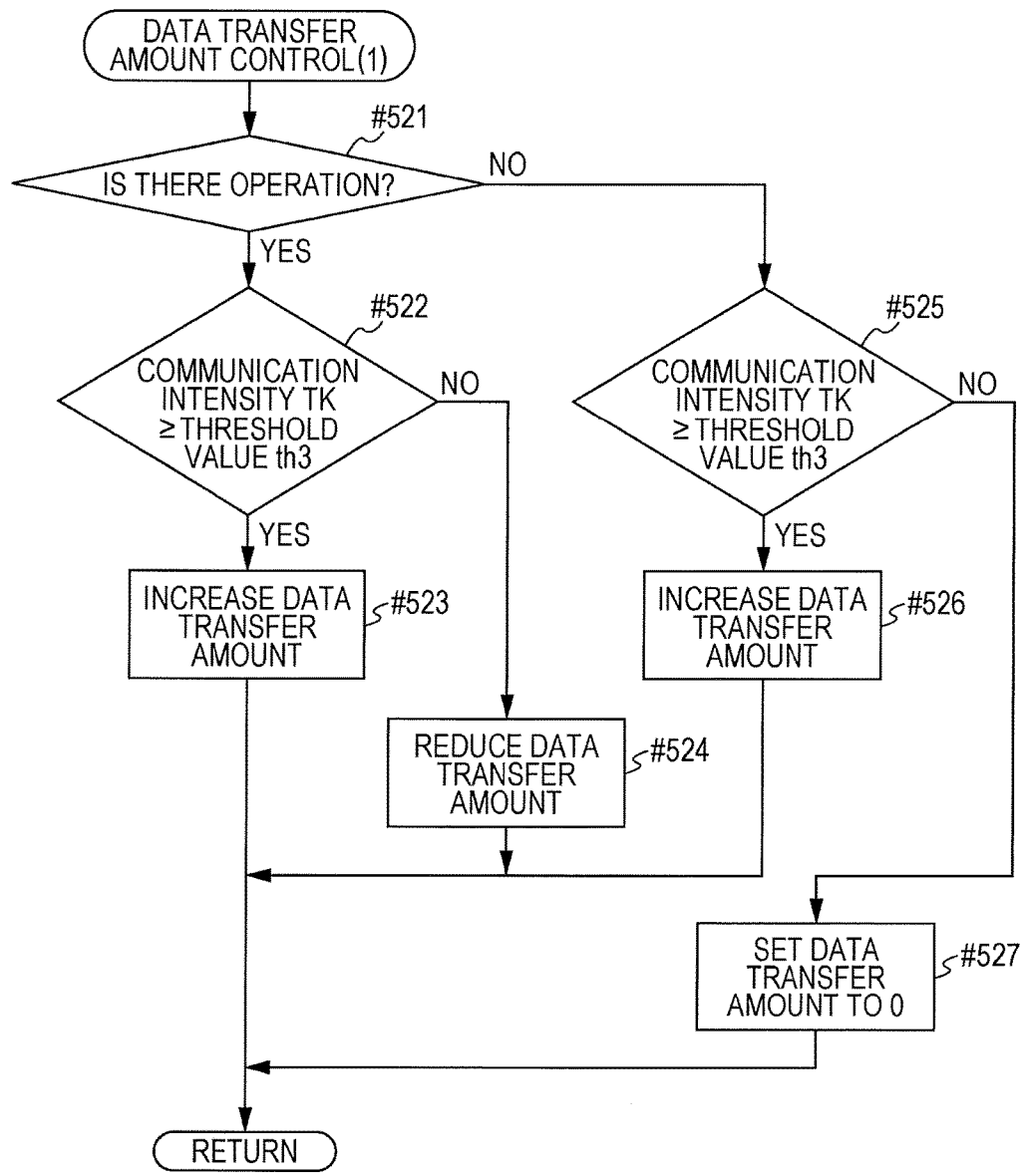
FIG. 11 is a flowchart illustrating a first example of a process for data transfer amount control.

In FIG. 11, a first example of the process for the data transfer amount control is illustrated.

In FIG. 11, it is checked whether the operation information S12 indicates that there is operation (#521), and it is also checked whether the communication intensity TK is equal to or greater than the threshold value th3 (#522, #525).

When the operation information S12 indicates that there is operation and the communication intensity TK is equal to or greater than the threshold value th3 (YES in #521 and YES in #522), the data transfer amount DT is increased (#523). This is based on a prediction that the user 3 is currently performing the operation at a position close to the communication base point P1 on the operation panel 12. In this case, for example, a possibility that the terminal device 2 goes out of the communication range 51 is predicted to be low since the radio wave intensity DK is large although the user 3 is moving his/her hand frequently while setting a job. Therefore, for example, the transmission unit US is increased without finely dividing the document data DD, whereby the time for the data transfer is made as short as possible. This case can also be called a transfer priority mode in which the data transfer is prioritized.

When the operation information S12 indicates that there is operation and the communication intensity TK is less than the threshold value th3 (YES in #521 and NO in #522), the data transfer amount DT is reduced (#524). This is based on a prediction that the user 3 is currently performing the operation at a position apart from the communication base point P1 on the operation panel 12. In this case, for example, a possibility that the terminal device 2 goes out of the communication range 51 and the communication is interrupted is predicted to be, high since the user 3 is moving his/her hand frequently while setting a job. Therefore, for example, the transmission unit US is reduced by finely dividing the document data DD, whereby unsuccessful transfer and corresponding retransfer hardly occur. This case can also be called an operation priority mode.

When the operation information S12 indicates that there is no operation and the communication intensity TK is equal to or greater than the threshold value th3 (NO in #521 and YES in #525), the data transfer amount DT is increased (#526). This is based on a prediction that the user 3 is currently waiting for the transfer or the authentication of the document data DD to be completed with his/her hand close to the communication base point P1 without performing the operation such as job setting. In this case, a possibility that the hand is moved away from the communication base point P1 by the time the data transfer is completed is predicted to be low, and the communication intensity TK is predicted to be in the most stable state. Therefore, for example, the transmission unit US is set to the maximum without finely dividing the document data DD, whereby the time for the entire data transfer is shortened. This case can also be called a transfer priority mode.

When the operation information S12 indicates that there is no operation and the communication intensity TK is less than the threshold value th3 (NO in #521 and NO in #525), the data transfer amount DT is set to 0 (#527). This is based on a prediction that the user 3 is currently not operating the operation panel 12, and the terminal device 2 is apart from the communication base point P1. In this case, it is predicted that the user 3 has only come to pick up printed paper or an original. Therefore, the data transfer is not required, and the data transfer amount DT is set to 0.

The threshold value th3 as used herein may be the same as the threshold value th1, or may be the same as the threshold value th0. The threshold value th3 may be an intermediate value between the threshold value th1 and the threshold value th0. Alternatively, a value greater than the threshold value th1 or a value less than the threshold value th0 may be used.

Figure 12:
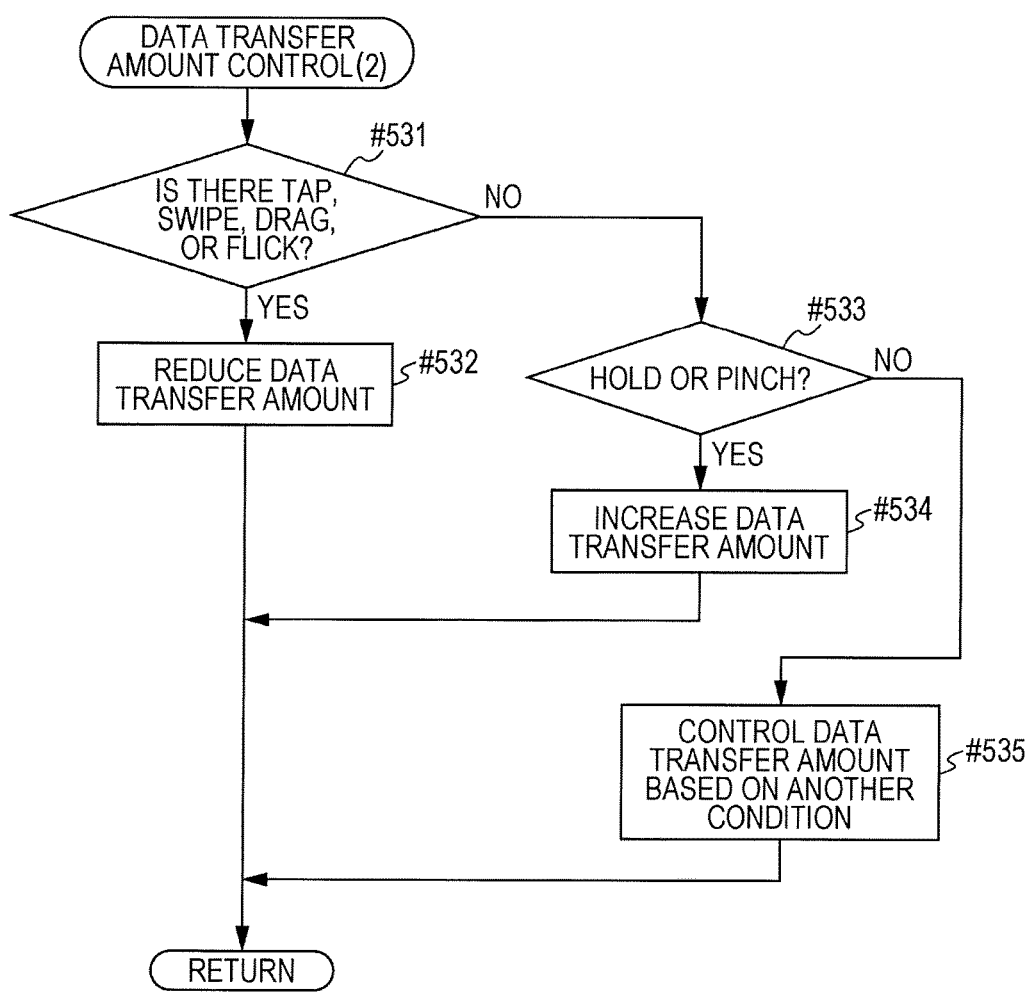
FIG. 12 is a flowchart illustrating a second example of the process for the data transfer amount control.
Figure 13:
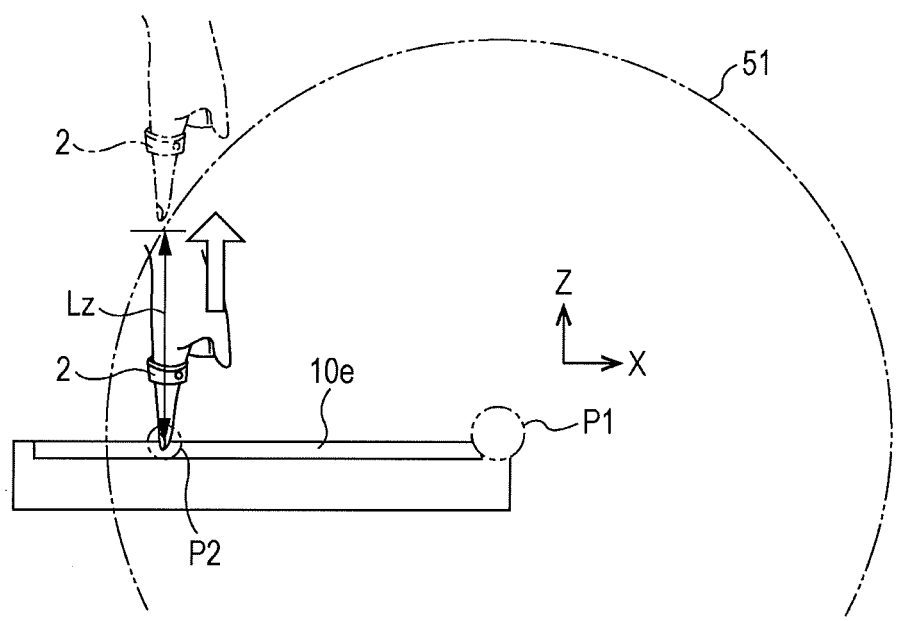
FIG. 13 is a diagram illustrating an exemplary movement of the terminal device that accompanies tap operation.

A second example of the process for the data transfer amount control is illustrated in FIG. 12, and an exemplary movement of the terminal device 2 that accompanies the tap operation is illustrated in FIG. 13.

The document processing device 1 controls the data transfer amount DT in accordance with the kind of the gesture operation indicated by the operation information S12.

More specifically, when the kind of the gesture operation indicated by the operation information S12 is the tap operation, the swipe operation, the drag operation, or the flick operation (YES in #531), the data transfer amount DT is reduced (#532). This is based on a prediction that a possibility that the terminal device 2 goes out of the communication range 51 and the communication is interrupted is high since the hand of the user 3 moves widely when these types of gesture operation are performed.

For example, in the tap operation, a finger of the user 3 that touches the touch panel display 10e moves in a direction vertical to a touch face (Z direction). As illustrated in FIG. 13, a distance Lz to the outside of the communication range 51 varies in accordance with a touch position P2. In a case where the touch position P2 is far from the communication base point P1, therefore, the terminal device 2 might go out of the communication range 51 when the finger is separated from the touch face.

To the contrary, when the kind of the gesture operation is the hold operation or the pinch operation (#533), the data transfer amount DT is increased (#534). This is based on a prediction that a possibility that the terminal device 2 goes out of the communication range 51 is small since the finger does not move in the hold operation, and the finger moves but an arm does not move in the pinch operation.

When the kind of the gesture operation is not the tap operation, the swipe operation, the drag operation, the flick operation, the hold operation, or the pinch operation (NO in #531 and NO in #533), the data transfer amount DT is controlled based on another condition (#535).

Figure 14:
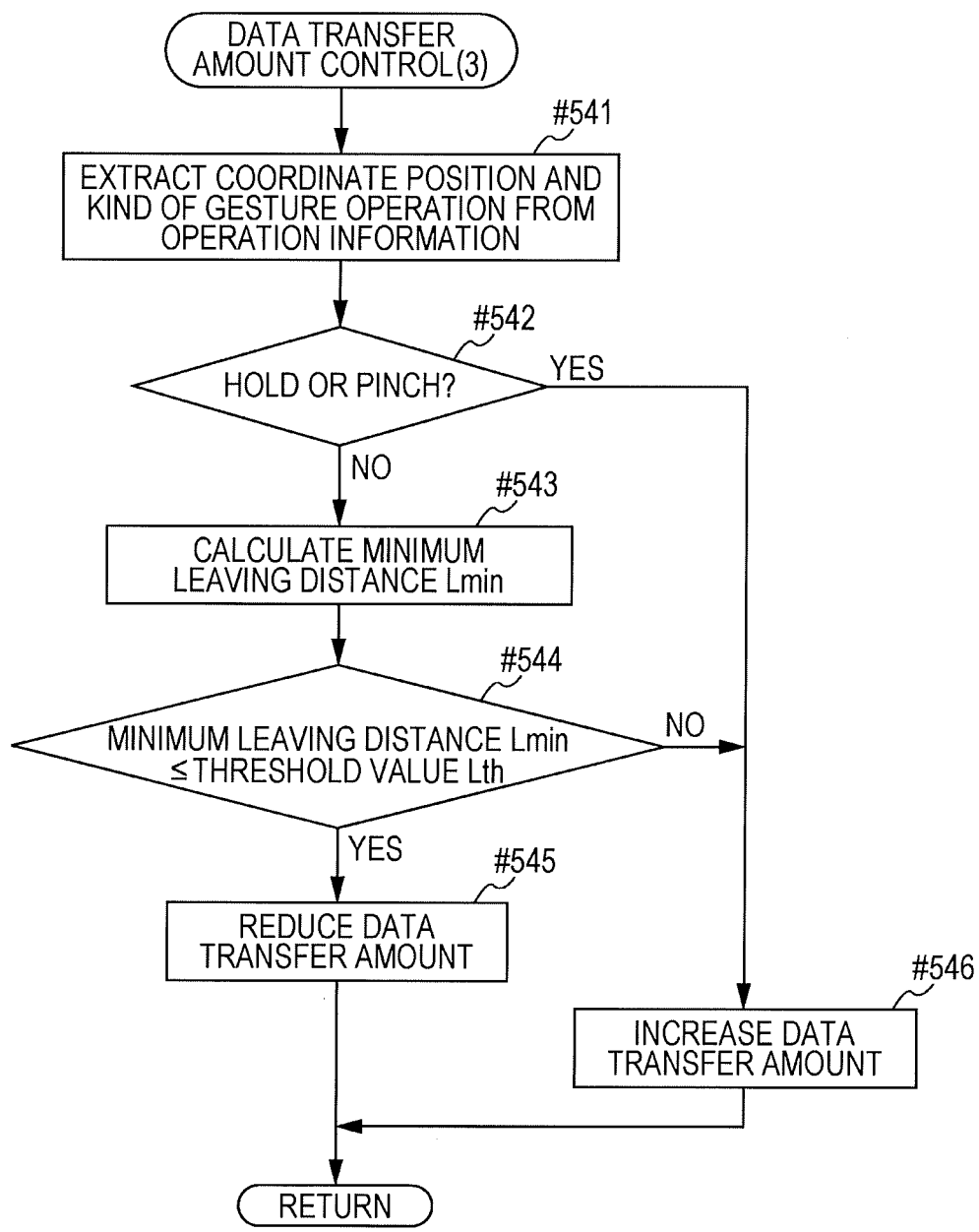
FIG. 14 is a flowchart illustrating a third example of the process for the data transfer amount control.
Figure 15A:
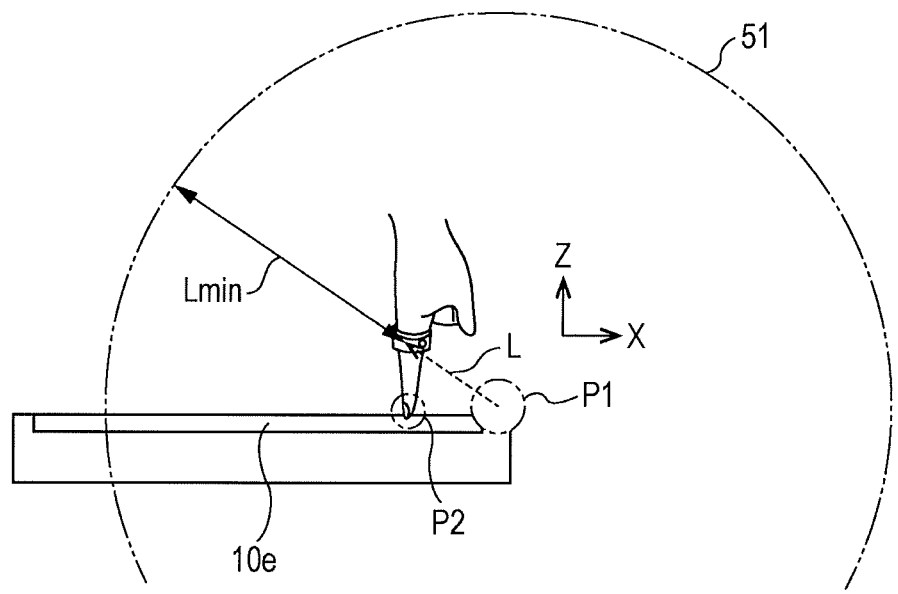
FIGS. 15A and 15B are diagrams illustrating an example of a minimum leaving distance.
Figure 15B:
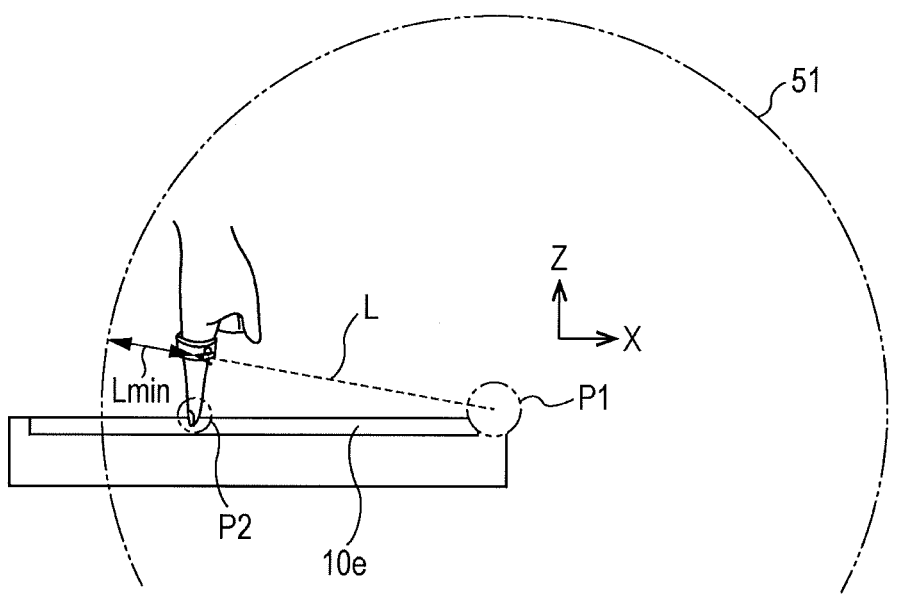

A third example of the process for the data transfer amount control is illustrated in FIG. 14, and an example of a minimum leaving distance Lmin is illustrated in FIGS. 15A and 15B.

In FIG. 14, a touch position (i.e., coordinate position) in XY coordinates and the kind of the gesture operation are extracted from the operation information S12 (#541).

When the kind of the gesture operation is the hold operation or the pinch operation (YES in #542), that is, when a possibility that the terminal device 2 goes out of the communication range 51 is predicted to be small, the data transfer amount DT is increased (#546).

When the kind of the gesture operation is not the hold operation or the pinch operation (NO in #542), the minimum leaving distance Lmin is predicted (#543). The minimum leaving distance Lmin is a distance from the terminal device 2 to the edge of the communication range 51.

The minimum leaving distance Lmin is a length of the shortest one of paths through which the terminal device 2 moves out of the communication range 51. Since the communication range 51 has a spherical shape, the minimum leaving distance Lmin is a distance between the terminal device 2 and the edge of the communication range 51 in a direction from the communication base point P1 toward the terminal device 2 (direction of a broken line arrow in FIGS. 15A and 15B).

In the example in FIGS. 15A and 15B, the minimum leaving distance Lmin is predicted on the assumption that a current position of the terminal device 2 at the time of the touch operation is a position right above (in Z direction) the touch position P2 and apart from the touch position P2 by 10 mm. More specifically, the minimum leaving distance Lmin is calculated on the assumption that coordinates of the touch position P2 are (x, y, 0) and coordinates of the terminal device 2 are (x, y, 10) in an XYZ coordinate space with an origin at the communication base point P1. A unit of a coordinate component is 1 mm.

Specifically, first, the distance L from the communication base point P1 to the terminal device 2 is calculated based on the well-known Pythagorean theorem. Next, the distance L is subtracted from a known distance (radius r1) between the communication base point P1 and the edge of the communication range 51. The minimum leaving distance Lmin is thus obtained.

For example, in a case where the coordinates of the terminal device 2 are (−30, 0, 10), assuming that the radius r1 is 100, the distance L is calculated to be 31.6, and the minimum leaving distance Lmin is 68.4. In a case where the coordinates of the terminal device 2 are (−90, 0, 10), the distance L is calculated as 91.5, and the minimum leaving distance Lmin is 9.5.

When the obtained minimum leaving distance Lmin is equal to or less than the threshold value Lth (for example, 50) (YES in #544), the data transfer amount DT is reduced (#545). For example, the data transfer amount DT is set to a value of less than 50% in the above-mentioned transmission unit US. At this time, the smaller the minimum leaving distance Lmin is, the smaller the value can be set. For example, the data transfer amount DT may be an amount obtained by multiplying a maximum amount by a coefficient k acting as the minimum leaving distance Lmin. In this case, for example, when the minimum leaving distance Lmin is 9.5, the data transfer amount DT is set to 9.5% of the maximum value.

When the obtained minimum leaving distance Lmin is greater than the threshold value Lth (NO in #544), the process proceeds to step #546, where the data transfer amount DT is increased.

In step #546, the same amount can be set as the data transfer amount DT both when YES is selected in step #542 and when NO is selected in step #544. Alternatively, different amounts can be set as the data transfer amounts DT for these cases. For example, the maximum amount can be set for both cases, or the maximum amount can be set when YES is selected in step #542 and an amount smaller than the maximum amount can be set when NO is selected in step #544.

Figure 16:
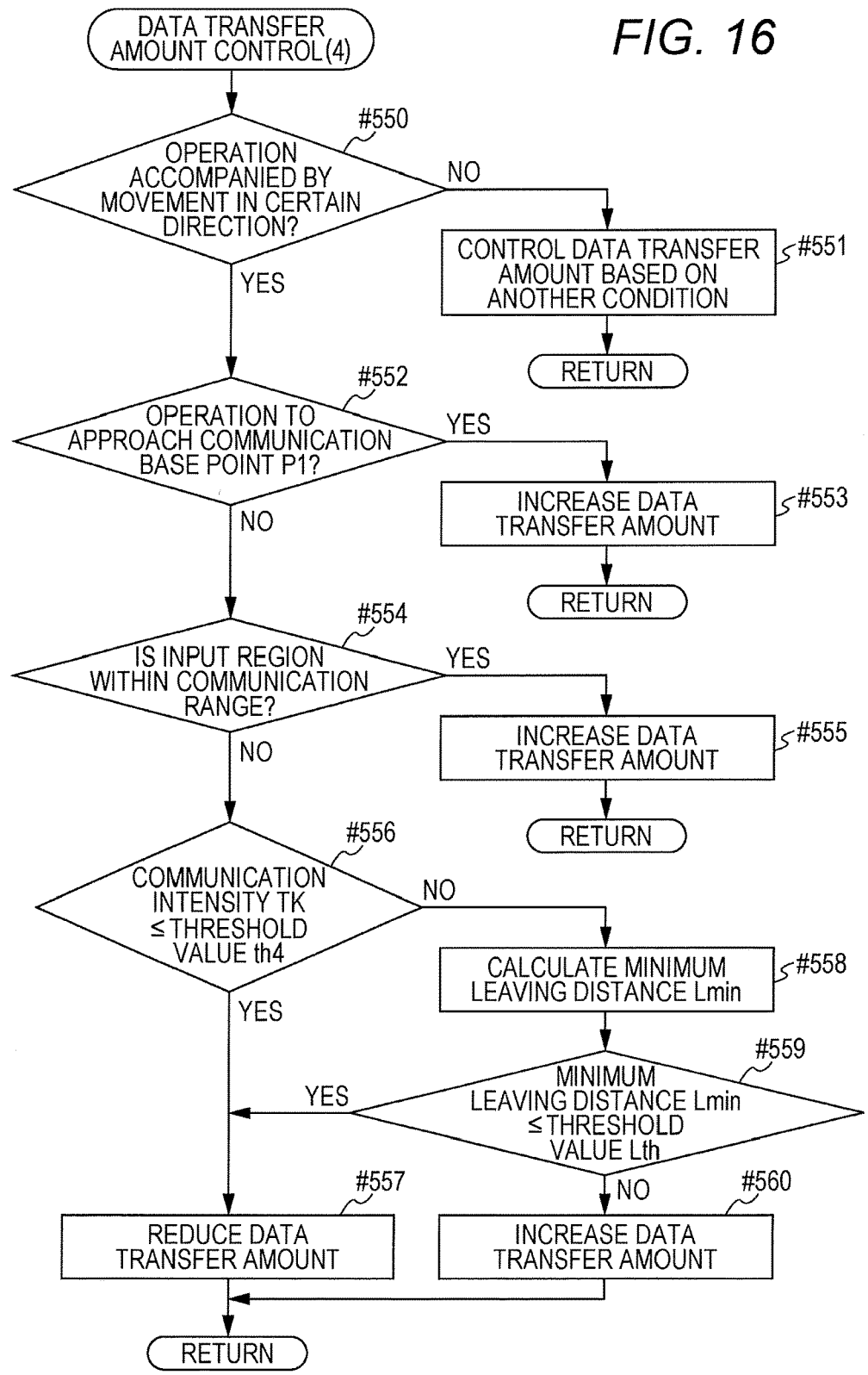
FIG. 16 is a flowchart illustrating a fourth example of the process for the data transfer amount control.

In FIG. 16, a fourth example of the process for the data transfer amount control is illustrated.

In FIG. 16, when operation, such as the swipe operation, accompanied by a movement in a certain direction parallel to the touch face is detected as the operation information S12 (YES in #550), it is checked whether the operation is accompanied by such a movement that the touch position P2 approaches the communication base point P1 (#552).

When YES is selected in this check, that is, when a possibility that the terminal device 2 goes out of the communication range 51 is small, the data transfer amount DT is increased (#553). For example, the maximum amount (100%) or an amount close to the maximum amount is set as the data transfer amount DT.

When NO is selected in the check in step #552, it is checked whether the entire input region arranged on the screen for the operation detected in step #550 is included in the communication range 51 (#554). The input region is a region associated with a process of moving the entire or a part of the screen in accordance with the operation. There are a variety of examples of the input region such as the operation key, a slide bar, a background part of the screen, and a region to display an image. The check in step #554 is easily performed if a positional relation between the input region and the communication range 51 is examined in advance, and information indicating whether the input region falls within the communication range 51 is prepared.

When YES is selected in the check in step #554, that is, when a possibility that the terminal device 2 goes out of the communication range 51 is small since the movement that accompanies the operation is a movement within the communication range 51, the data transfer amount DT is increased (#555). For example, an amount equal to or greater than 50% is set as the data transfer amount DT. However, since the possibility that the terminal device 2 goes out of the communication range 51 is larger than that predicted when the touch position P2 approaches the communication base point P1, an amount smaller than the amount set in step #553 is preferably set in step #555.

On the other hand, when NO is selected in the check in step #554, it is checked whether the communication intensity TK is equal to or less than the threshold value th4 (#556).

When the communication intensity TK is equal to or less than the threshold value th4 (YES in #556), the data transfer amount DT is reduced (#557). For example, an amount within a range of 5 to 50% is set as the data transfer amount DT.

When the communication intensity TK exceeds the threshold value th4 (NO in #556), the minimum leaving distance Lmin is calculated (#558).

When the minimum leaving distance Lmin is equal to or less than the threshold value Lth (YES in #559), the process proceeds to the above-mentioned step #557, where the data transfer amount DT is reduced. When the minimum leaving distance Lmin exceeds the threshold value Lth (NO in #559), the data transfer amount DT is increased (#560). For example, an amount equal to or greater than 50% is set as the data transfer amount DT.

When NO is selected in step #550, the data transfer amount DT is controlled based on another condition (#551).

Figure 17:
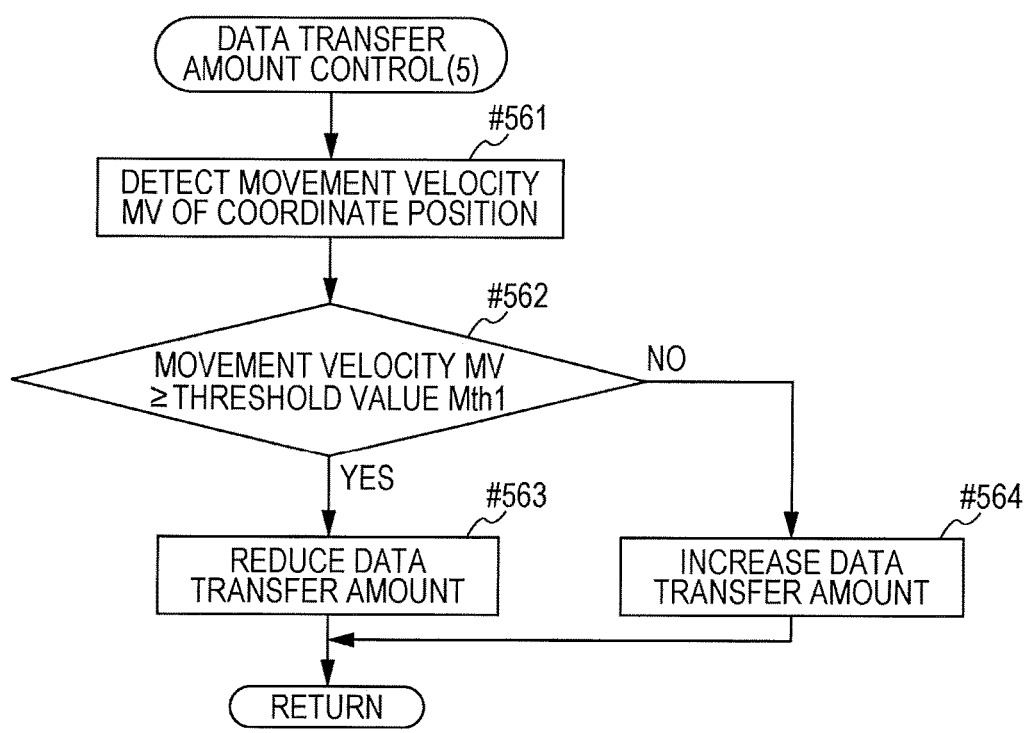
FIG. 17 is a flowchart illustrating a fifth example of the process for the data transfer amount control.

In FIG. 17, a fifth example of the process for the data transfer amount control is illustrated.

In FIG. 17, the operation information S12 is acquired periodically, and the movement velocity MV of the coordinate position indicated by the operation information S12 is detected (#561).

When the movement velocity MV is equal to or greater than the threshold value Mth1 (YES in #562), that is, when a possibility that the terminal device 2 goes out of the communication range 51 in a short time is considered to be large, the data transfer amount DT is reduced (#563). For example, an amount less than 50% is set as the data transfer amount DT.

When the movement velocity MV is less than the threshold value Mth1 (NO in #562), the data transfer amount DT is increased (#563). For example, an amount equal to or greater than 50% is set as the data transfer amount DT.

Figure 18:
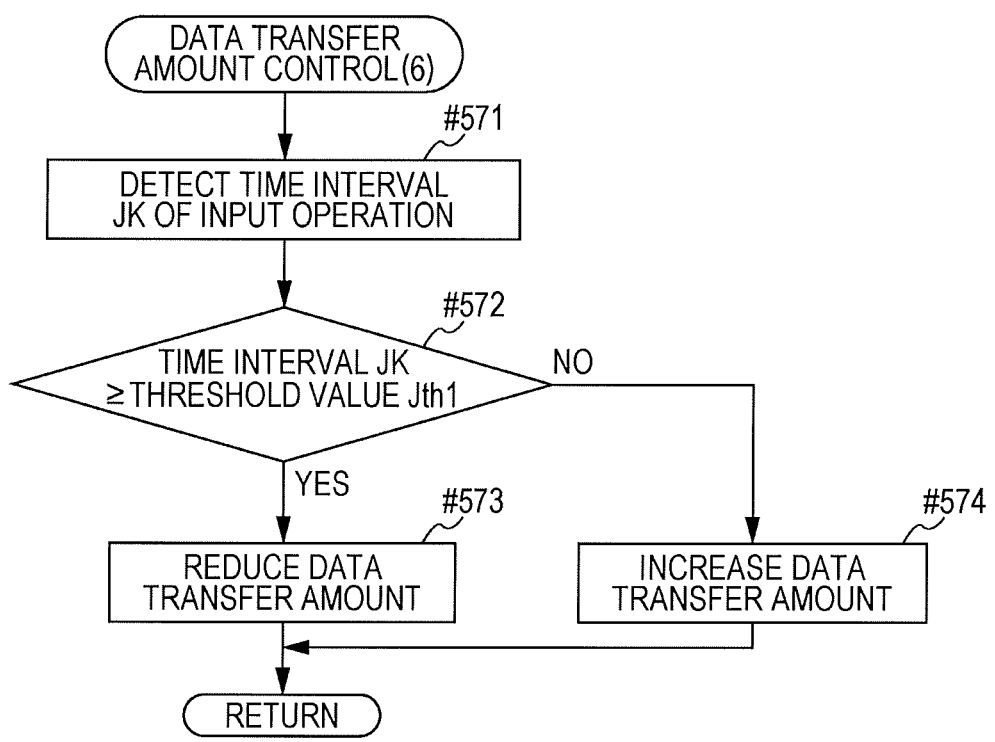
FIG. 18 is a flowchart illustrating a sixth example of the process for the data transfer amount control.

In FIG. 18, a sixth example of the process for the data transfer amount control is illustrated.

In FIG. 18, the operation information S12 is acquired periodically, and the time interval JK of the input operation for the operation panel 12 is detected (#571).

When the time interval JK is equal to or greater than the threshold value Jth1 (YES in #572), that is, when the user 3 is at a loss for operation and moves irregularly, and thus a possibility that the terminal device 2 suddenly goes out of the communication range 51 is predicted to be large, the data transfer amount DT is reduced (#573). For example, an amount within a range of 5 to 30% is set as the data transfer amount DT.

When the time interval JK is less than the threshold value Jth1 (NO in #572), the data transfer amount DT is increased (#574). For example, an amount equal to or greater than 50% is set as the data transfer amount DT.

Figure 19:
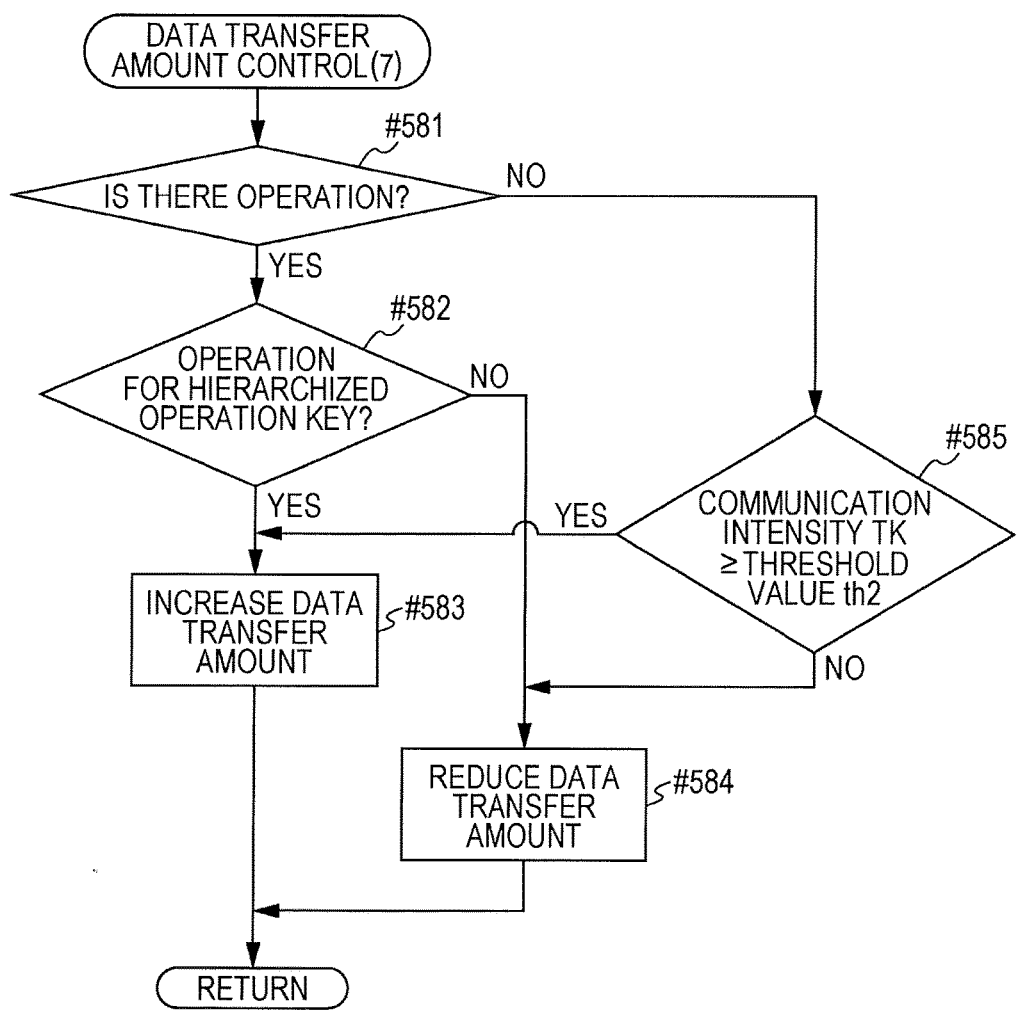
FIG. 19 is a flowchart illustrating a seventh example of the process for the data transfer amount control.

In FIG. 19, a seventh example of the process for the data transfer amount control is illustrated.

The seventh example illustrated in FIG. 19 is an example of controlling the data transfer amount DT in accordance with operation by a plurality of hierarchized screens. The operation by the plurality of hierarchized screens is conducted in such a procedure that a second or lower screen is called from the highest (first) screen as necessary. In a case where the user 3 calls the second or lower screen, the user 3 often calls a screen lower or higher than that screen. In other words, the user 3 often keeps his/her hand in the communication range 51 until the user 3 calls another screen. In this case, therefore, a possibility that the terminal device 2 goes out of the communication range 51 in a short time is small.

When the operation information S12 indicates that there is operation (YES in #581), it is checked whether the input operation for the hierarchized operation key is performed (#582). The hierarchized operation key is an operation key arranged on the second or lower screen in the hierarchy.

When YES is selected in step #582, the data transfer amount DT is increased (#583). For example, an amount equal to or greater than 50% is set as the data transfer amount DT.

When there is operation other than the input operation for the hierarchized operation key (NO in #582), the data transfer amount DT is reduced. For example, an amount less than 50% is set as the data transfer amount DT.

When the operation information S12 indicates that there is no operation and the communication intensity TK is equal to or greater than the threshold value th2 (NO in #581 and YES in #585), the process proceeds to the above-mentioned step #583, where the data transfer amount DT is increased. When the communication intensity TK is less than the threshold value th2 (NO in #585), the process proceeds to step #584, where the data transfer amount DT is reduced.

The examples of controlling the data transfer amount DT in the document data communication that transfers the document data DD have been described so far. These examples are not limited to the transfer of the document data DD. The data transfer amount DT may be controlled when data communication that transfers authentication data DA is executed. For example, when the above-mentioned biological information such as a pulse wave is transferred as the authentication data DA, an amount of time required for the transfer is longer than that required for transferring another authentication data such as a user ID and a password. The control of the data transfer amount DT is effective in preventing the transfer of the authentication data DA from being interrupted.

Figure 20:
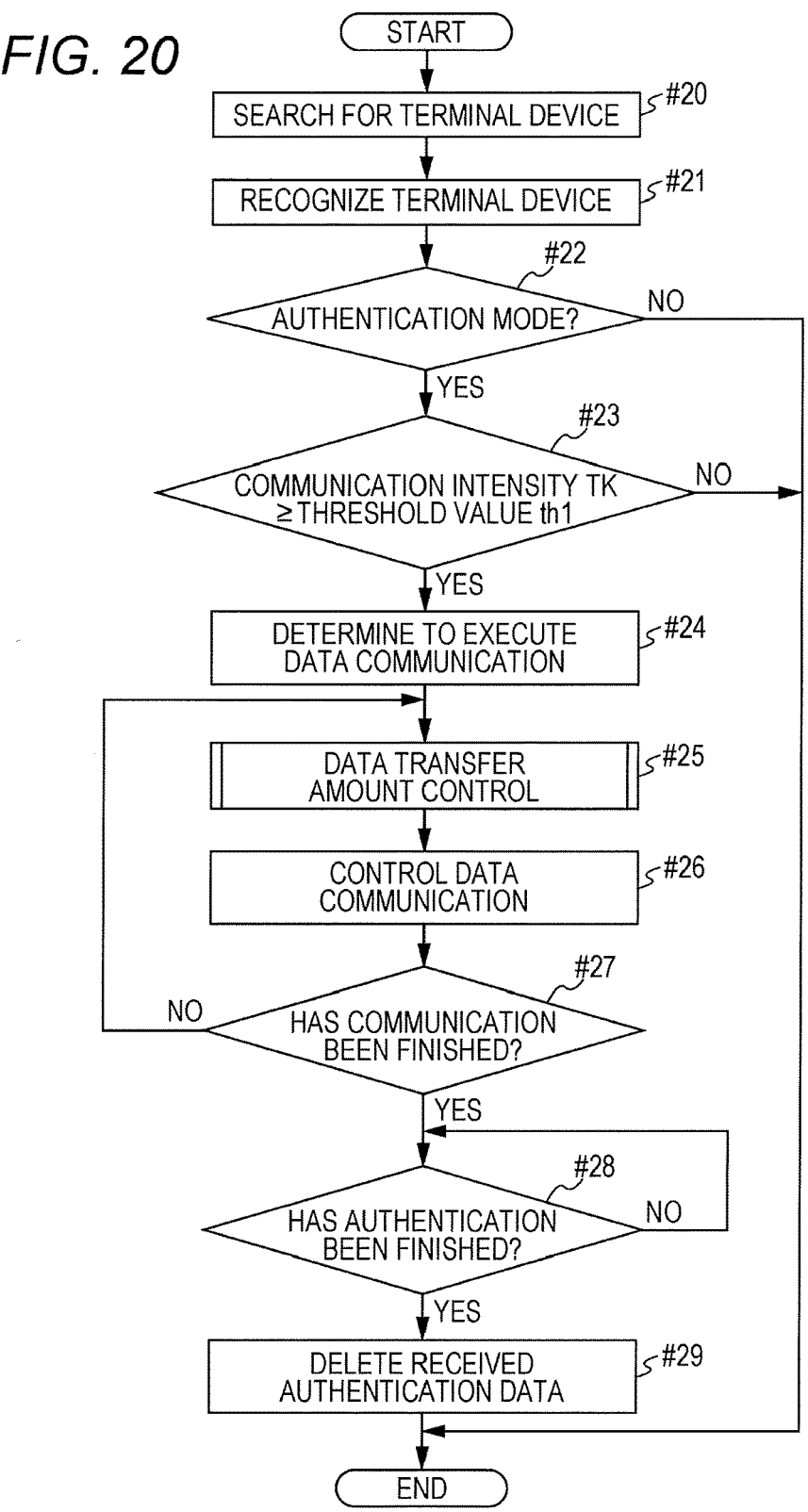
FIG. 20 is a flowchart illustrating another example of the overall process flow in the document processing device.

In FIG. 20, another example of the overall process flow in the document processing device 1 is illustrated. The example in FIG. 20 is an example of controlling the data transfer amount DT at the time of the transfer of the authentication data DA.

In FIG. 20, the terminal device 2 is searched for (#20), and the terminal device 2 that has entered the temporary communication range 51 is recognized as the terminal device 2 permitted to be a partner in the data communication (#21). The process is the same as the process of the flow in FIG. 10 so far.

In the case of the authentication mode in which the user 3 is authenticated (YES in #22), the communication intensity TK is checked (#23). When the communication intensity TK is equal to or greater than the threshold value th1 (YES in #23), the terminal device 2 is determined to have entered the definitive communication range 51, and the data communication is determined to be executed (#24).

When the authentication mode is not executed (NO in #22), and the communication intensity TK is not equal to or greater than the threshold value th1 (NO in #23), the process of the flow in FIG. 20 is finished.

When the data communication is determined to be executed, a process of the "data transfer amount control" is performed to set the data transfer amount DT for each block of the authentication data DA (#25). A flow of this process is the same as the flows illustrated in FIGS. 11, 12, 14, and 16 to 19 mentioned above.

The data communication in which the data transfer amount DT is controlled for each block and the authentication data DA are transferred is performed together with the terminal device 2 (#26). During the data communication (NO in #27), the data transfer amount control is performed each time the block is transferred.

When the data communication is finished and the authentication of the user 3 by the authentication data DA is finished (YES in #27 and YES in #28), the authentication data DA received from the terminal device 2 are deleted (#29).

In the above-mentioned embodiment, at a stage before the end of the document data communication between the terminal device 2 and the wireless communication unit 10$p$, the data transfer amount control unit 105 can increase the data transfer amount DT when a remaining amount of the document data DD to be transferred by the document data communication becomes equal to or less than a threshold value. For example, the data transfer amount DT is set to the maximum amount.

This is because a possibility of interruption of the document data communication becomes small since the document data communication is about to be finished. In this case, the communication is enabled to be completed more quickly.

The document data communication is not limited to the data transfer from the terminal device 2 to the document processing device 1, and may be transfer of the document data DD or data for authentication from the document processing device 1 to the terminal device 2.

The document processing device 1 is not limited to the MFP, and only needs to be a device that processes document data. The document processing device 1 may be a copy machine, a printer, a facsimile machine, a scanner or the like.

The position of the communication base point P1 is not limited to the corner of the operation panel 12. Another position in the center of a display face of the touch panel display 10$e$ or within the display face may be set as the communication base point P1. The size of each of the communication ranges 50, 51 and the range of the distance L are not limited to the values in the examples.

The threshold values th0, th1, th2, th3, th4, Lth1, Mth1, Jth1 can be optimized based on, for example, a result of an experiment. Each of these threshold values may be a fixed value or a variable value that is adjusted in accordance with an environment including a state of a radio wave. In the comparison between the communication intensity TK or the like and the threshold value, a plurality of threshold values may be used in each comparison, and the data transfer amount DT corresponding to the compared threshold value may be set.

In the screen displayed on the operation panel 12, a probability that the terminal device 2 goes out of the communication range 51 may be calculated based on the number of operation keys arranged inside the communication range 51 and the number of operation keys arranged outside the communication range 51 or arranged over the inside and the outside of the communication range 51, and the data transfer amount may be controlled in accordance with the probability. In this case, for example, the data transfer amount is reduced when the probability is greater than a threshold value, and the data transfer amount is increased when the probability is less than the threshold value.

Additionally, in accordance with the gist of the present invention, it is possible to appropriately change, for example: the configuration of all or a part of the operation panel 12, the wireless communication unit 10*p*, the communication intensity detection unit 102, the operation information detection unit 103, the communication execution determination unit 104, the data transfer amount control unit 105, the data acquisition unit 107, the terminal device 2, or the document processing device 1; details, order, or timing of the process; and details or timing of the control of the data transfer amount DT.

According to an embodiment of the present invention, in a document processing device including a touchscreen type operation panel and configured to be capable of communicating with a terminal device, a position of which is likely to move in accordance with operation by a user for the operation panel, a possibility of interruption of the communication is made as small as possible, whereby working efficiency can be improved.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A document processing device including a touchscreen type operation panel and configured to be capable of communicating with a terminal device, a position of the terminal device being likely to move in accordance with operation by a user for the operation panel, the document processing device comprising:
   a communication unit configured to transmit and receive a radio wave to and from the terminal device to perform communication;
   a communication intensity detection unit configured to detect communication intensity of the terminal device received at the communication unit;
   an operation information detection unit configured to detect operation information indicating a detail of input operation when the input operation for the operation panel is performed; and
   a data transfer amount control unit configured to control a data transfer amount in the communication between the terminal device and the communication unit based on the communication intensity detected by the communication intensity detection unit and the operation information detected by the operation information detection unit.

2. The document processing device according to claim 1, wherein the data transfer amount control unit controls the data transfer amount in accordance with a kind of gesture operation indicated by the operation information.

3. The document processing device according to claim 2, wherein when the kind of the gesture operation indicated by the operation information is tap operation, swipe operation, drag operation, or flick operation, the data transfer amount is reduced, and
   when the kind of the gesture operation indicated by the operation information is hold operation or pinch operation, the data transfer amount is increased.

4. The document processing device according to claim 1, wherein the data transfer amount control unit is configured to:
   increase the data transfer amount when the operation information indicates that there is operation and the communication intensity is greater than a threshold value;
   reduce the data transfer amount when the operation information indicates that there is operation and the communication intensity is less than the threshold value;
   increase the data transfer amount when the operation information indicates that there is no operation and the communication intensity is greater than the threshold value; and
   set the data transfer amount to 0 when the operation information indicates that there is no operation and the communication intensity is less than the threshold value.

5. The document processing device according to claim 1, wherein the data transfer amount control unit predicts and obtains a distance from the terminal device to a position where the terminal device goes out of a communication range based on a coordinate position and a kind of gesture operation indicated by the operation information, and controls the data transfer amount in accordance with the obtained distance.

6. The document processing device according to claim 1, wherein in a case where the operation information detection unit detects, as the operation information, operation accompanied by a movement in a certain direction, the data transfer amount control unit reduces the data transfer amount when the communication intensity is equal to or less than a threshold value, and increases the data transfer amount when the communication intensity exceeds the threshold value.

7. The document processing device according to claim 1, wherein the data transfer amount control unit reduces the data transfer amount when a movement velocity of a coordinate position indicated by the operation information is greater than a threshold value.

8. The document processing device according to claim 1, wherein the data transfer amount control unit reduces the data transfer amount when an interval of the input operation for the operation panel is longer than a threshold value.

9. The document processing device according to claim 1, wherein the data transfer amount control unit increases the data transfer amount when input operation for a hierarchized operation key is performed on the operation panel.

10. The document processing device according to claim 1, comprising a communication execution determination unit configured to determine whether to execute the communication with the terminal device, wherein
    when the communication intensity exceeds a threshold value, the communication execution determination unit determines that the terminal device is within a communication range and to execute the communication with the terminal device, and the data transfer amount control unit predicts and obtains a distance from the terminal device to a position where the terminal device goes out of the communication range based on a coordinate position indicated by the operation information and the communication intensity, and controls the data transfer amount in accordance with the obtained distance.

11. The document processing device according to claim 1, comprising a communication execution determination unit configured to determine whether to execute the communication with the terminal device, wherein in the case of an authentication mode, when the communication intensity exceeds a threshold value, the communication execution determination unit determines to execute the communication with the terminal device, and the data transfer amount control unit controls the data transfer amount in the communication between the terminal device and the communication unit in accordance with the magnitude of the communication intensity, and the communication unit finishes the communication with the terminal device after the authentication is completed.

12. The document processing device according to claim 1, comprising a communication execution determination unit configured to determine whether to execute the communication with the terminal device, wherein when the communication intensity exceeds a threshold value, the communication execution determination unit determines to execute the communication with the terminal device, the data transfer amount control unit controls the data transfer amount in the communication between the terminal device and the communication unit in accordance with the magnitude of the communication intensity, and the communication unit executes the communication and receives document data when the document data are stored in the terminal device, and the communication unit finishes the communication with the terminal device after the reception of the document data is completed.

13. The document processing device according to claim 1, wherein the data transfer amount is a data transfer velocity.

14. The document processing device according to claim 1, wherein the data transfer amount is a transmission unit of data transmitted from the terminal device to the communication unit.

15. A communication control method in a document processing device including a touchscreen type operation panel and configured to be capable of communicating with a terminal device, a position of the terminal device being likely to move in accordance with operation by a user for the operation panel, the communication control method comprising:

controlling a data transfer amount in the communication with the terminal device based on communication intensity of a radio wave from the terminal device and operation information detected by input operation for the operation panel.

16. A non-transitory recording medium storing a computer readable program used in a computer of a document processing device including a touchscreen type operation panel and configured to be capable of communicating with a terminal device, a position of the terminal device being likely to move in accordance with operation by a user for the operation panel, the program causing the computer to execute:

a process of detecting communication intensity of a radio wave from the terminal device;

a process of detecting operation information by input operation for the operation panel; and a process of controlling a data transfer amount in the communication with the terminal device based on the communication intensity and the operation information.

17. A document processing device comprising:

a touchscreen type operation panel;

a communication unit configured to perform data communication with a terminal device held by a hand of a user;

a detection unit configured to detect touch operation by a user on the operation panel;

a control unit configured to control a data communication amount of the communication unit in accordance with the touch operation detected by the detection unit.

18. The document processing device according to claim 17, wherein when the kind of the touch operation is a tap operation, a swipe operation, a drag operation, or a flick operation, the data communication amount is reduced; and when the kind of the operation is a hold operation or a pinch operation, the data communication amount is increased.

19. The document processing device according to claim 17, further comprising a communication intensity detection unit configured to detect communication intensity of the communication unit;

wherein when the operation information detection unit detects, as the operation information, operation accompanied by a movement in a certain direction, the data transfer amount control unit reduces the data transfer amount when the communication intensity is equal to or less than a threshold value, and increases the data transfer amount when the communication intensity exceeds the threshold value.

20. The document processing device according to claim 17, further comprising a communication intensity detection unit configured to detect communication intensity of the communication unit;

wherein the data transfer amount control unit reduces the data transfer amount when a movement velocity of a coordinate position indicated by the operation information is greater than a threshold value.

* * * * *